United States Patent
Kaufmann et al.

(10) Patent No.: US 11,489,441 B2
(45) Date of Patent: Nov. 1, 2022

(54) REFERENCE VOLTAGE GENERATION CIRCUITS AND RELATED METHODS

(71) Applicant: Texas Instruments Incorporated, Dallas, TX (US)

(72) Inventors: Maik Peter Kaufmann, Freising (DE); Michael Lueders, Freising (DE); Bernhard Wicht, Gehrden (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/890,537

(22) Filed: Jun. 2, 2020

(65) Prior Publication Data
US 2021/0376718 A1    Dec. 2, 2021

(51) Int. Cl.
*H02M 3/157*    (2006.01)
*G05F 1/46*    (2006.01)
(Continued)

(52) U.S. Cl.
CPC .............. *H02M 3/07* (2013.01); *G05F 1/465* (2013.01); *G05F 3/18* (2013.01); *H02M 3/157* (2013.01);
(Continued)

(58) Field of Classification Search
CPC ..... G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247;
(Continued)

(56) References Cited

U.S. PATENT DOCUMENTS 4,433,253 A * 2/1984 Zapisek ............. H03K 5/15013
326/119
5,838,145 A * 11/1998 Poon ................... H02M 1/4208
323/266
(Continued)

OTHER PUBLICATIONS

Maik Kaufmann et al., "A monolithic GaN-IC with integrated control loop for 400V offline buck operation achieving 95.6% peak efficiency", IEEE International solid state circuits conference, pp. 6-8, Dec. 14, 2019 (Year: 2019).*

(Continued)

*Primary Examiner* — Thienvu V Tran
*Assistant Examiner* — Nusrat Quddus
(74) *Attorney, Agent, or Firm* — Valerie M. Davis; Charles A. Brill; Frank D. Cimino

(57) ABSTRACT

Reference voltage generation circuits and related methods are disclosed. An example reference voltage generation circuit includes a voltage generating circuit including an enhancement mode (E-mode) gallium nitride (GaN) transistor, the voltage generating circuit to, in response to a first clock signal having a first phase, generate a first voltage associated with the E-mode GaN transistor, and, in response to a second clock signal having a second phase different from the first phase, generate a second voltage associated with the E-mode GaN transistor, and a switching capacitor circuit coupled to the voltage generating circuit, the switching capacitor circuit to generate a reference voltage based on a difference between the first voltage and the second voltage.

23 Claims, 8 Drawing Sheets

(51) Int. Cl.
*H02M 3/07* (2006.01)
*G05F 3/18* (2006.01)
*H02M 1/00* (2006.01)

(52) U.S. Cl.
CPC ........ *H02M 1/0006* (2021.05); *H02M 1/0025* (2021.05); *H02M 1/0041* (2021.05)

(58) Field of Classification Search
CPC .......... G05F 3/262; G05F 3/265; G05F 3/267; G05F 1/463; G05F 1/468; G05F 1/46; G05F 1/461; G05F 1/575; G05F 1/465; G05F 1/00; G05F 1/10; G05F 1/12; G05F 1/455; G05F 1/45; G05F 1/445; G05F 1/66; G05F 1/40; G05F 1/42; G05F 1/462; G05F 1/52; G05F 1/56; H02M 5/2573; H02M 5/293; H02M 1/081; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 3/1582; H02M 2003/1566; H02M 2003/1557; H05B 39/048; B23K 11/24; H04B 2215/069
See application file for complete search history.

(56) References Cited

U.S. PATENT DOCUMENTS

| | | | | |
|---|---|---|---|---|
| 6,040,736 | A * | 3/2000 | Milanesi | G05F 1/575 323/316 |
| 6,072,742 | A * | 6/2000 | Ooishi | G11C 5/143 365/189.07 |
| 7,187,159 | B2 * | 3/2007 | Katoh | H02M 3/07 323/285 |
| 7,816,951 | B1 * | 10/2010 | Lee | G11C 27/024 327/94 |
| 7,944,276 | B2 * | 5/2011 | Nakai | H02M 3/07 327/536 |
| 8,890,493 | B2 * | 11/2014 | Isik | H02M 3/07 323/266 |
| 8,896,386 | B2 * | 11/2014 | Lee | H03L 7/087 331/34 |
| 9,159,725 | B2 * | 10/2015 | Forghani-Zadeh | H03K 17/567 |
| 9,748,949 | B1 * | 8/2017 | Lu | H01L 27/0605 |
| 10,061,336 | B1 * | 8/2018 | Shor | G05F 1/59 |
| 10,073,478 | B1 * | 9/2018 | Ivanov | G05F 1/595 |
| 10,243,546 | B2 * | 3/2019 | de Rooij | H03K 17/063 |
| 10,263,514 | B1 * | 4/2019 | Aboueldahab | H02M 3/07 |
| 10,284,194 | B2 * | 5/2019 | Sharma | H01L 29/2003 |
| 10,720,913 | B1 * | 7/2020 | Leong | H03K 17/08142 |
| 10,958,166 | B1 * | 3/2021 | Low | G05F 1/565 |
| 11,257,811 | B2 * | 2/2022 | Arnold | H01L 28/20 |
| 2001/0017566 | A1 * | 8/2001 | Nakahara | H02M 3/07 327/536 |
| 2004/0222775 | A1 * | 11/2004 | Muramatsu | H02M 3/07 323/282 |
| 2005/0062518 | A1 * | 3/2005 | Seo | H02M 3/073 327/535 |
| 2007/0030037 | A1 * | 2/2007 | Wang | G11C 27/026 327/93 |
| 2007/0103221 | A1 * | 5/2007 | Ogita | H03K 5/1515 327/291 |
| 2007/0279031 | A1 * | 12/2007 | Takeyama | G05F 1/465 323/314 |
| 2008/0122491 | A1 * | 5/2008 | Kuan | H03D 13/005 327/43 |
| 2008/0123417 | A1 * | 5/2008 | Byeon | G11C 8/10 365/185.05 |
| 2009/0072800 | A1 * | 3/2009 | Ramadass | H02M 3/1584 323/271 |
| 2009/0096488 | A1 * | 4/2009 | Han | H03K 5/135 327/77 |
| 2010/0013445 | A1 * | 1/2010 | Martinussen | H02M 3/07 323/234 |
| 2011/0156681 | A1 * | 6/2011 | Nakagawara | H02M 3/156 323/283 |
| 2011/0199137 | A1 * | 8/2011 | Nagaraj | H03L 7/093 327/157 |
| 2013/0043848 | A1 * | 2/2013 | Lin | G05F 1/561 323/234 |
| 2013/0069613 | A1 * | 3/2013 | Nakase | H02M 3/156 323/284 |
| 2013/0241621 | A1 * | 9/2013 | Forghani-Zadeh | H03K 17/08122 327/315 |
| 2013/0293139 | A1 * | 11/2013 | Sadwick | H05B 45/28 315/224 |
| 2015/0042302 | A1 * | 2/2015 | Forghani-zadeh | G06F 1/3296 323/282 |
| 2015/0091538 | A1 * | 4/2015 | Fu | H02M 3/1563 323/271 |
| 2015/0214964 | A1 * | 7/2015 | Huynh | G11C 5/145 365/185.18 |
| 2016/0006336 | A1 * | 1/2016 | Bennett | H02M 3/158 323/271 |
| 2016/0065204 | A1 * | 3/2016 | Zojer | H03K 17/133 327/109 |
| 2016/0094213 | A1 * | 3/2016 | Liu | H03K 7/06 455/73 |
| 2018/0262190 | A1 * | 9/2018 | Horwitz | H03K 17/567 |
| 2018/0336957 | A1 * | 11/2018 | Mi | G11C 19/287 |
| 2019/0130857 | A1 * | 5/2019 | Ma | G09G 3/20 |
| 2019/0131967 | A1 * | 5/2019 | Banerjee | H03K 17/302 |
| 2019/0238119 | A1 * | 8/2019 | Chern | H03K 3/356017 |
| 2020/0274530 | A1 * | 8/2020 | Lueders | H02M 1/08 |
| 2021/0044286 | A1 * | 2/2021 | Kaufmann | H03K 17/0822 |

OTHER PUBLICATIONS

K. Wong, W. Chen and K. J. Chen, "Integrated voltage reference and comparator circuits for GaN smart power chip technology," 2009 21st International Symposium on Power Semiconductor Devices & IC's, Barcelona, Jun. 2009, pp. 57-60, doi: 10.1109/ISPSD.2009.5158000 (4 pages).

N. Fichtenbaum, M. Giandalia, S. Sharma and J. Zhang, "Half-Bridge GaN Power ICs: Performance and Application," in IEEE Power Electronics Magazine, vol. 4, No. 3, pp. 33-40, Sep. 2017, doi: 10.1109/MPEL.2017.2719220 (8 pages).

Y. Lin, H. Zhang and T. Yoshihara, "A CMOS low-voltage reference based on body effect and switched-capacitor technique," 2013 International SoC Design Conference (ISOCC), Busan, Nov. 2013, pp. 091-094, doi: 10.1109/ISOCC.2013.6863994 (4 pages).

* cited by examiner

REFERENCE VOLTAGE GENERATION CIRCUITS AND RELATED METHODS

FIELD OF THE DISCLOSURE

This disclosure relates generally to circuits and, more particularly, to reference voltage generation circuits and related methods.

BACKGROUND

Various circuit topologies rely on a reference voltage to operate. For instance, an output voltage of a power converter can be controlled based on a comparison of the output voltage to a reference voltage. In some instances, the reference voltage can be generated based on absolute parameters of silicon transistors, such as a conductance or threshold voltage of the silicon transistors. Generating the reference voltage based on the absolute parameters of gallium nitride transistors may lead to relatively large variations of the reference voltage.

DETAILED DESCRIPTION

Figure 1:
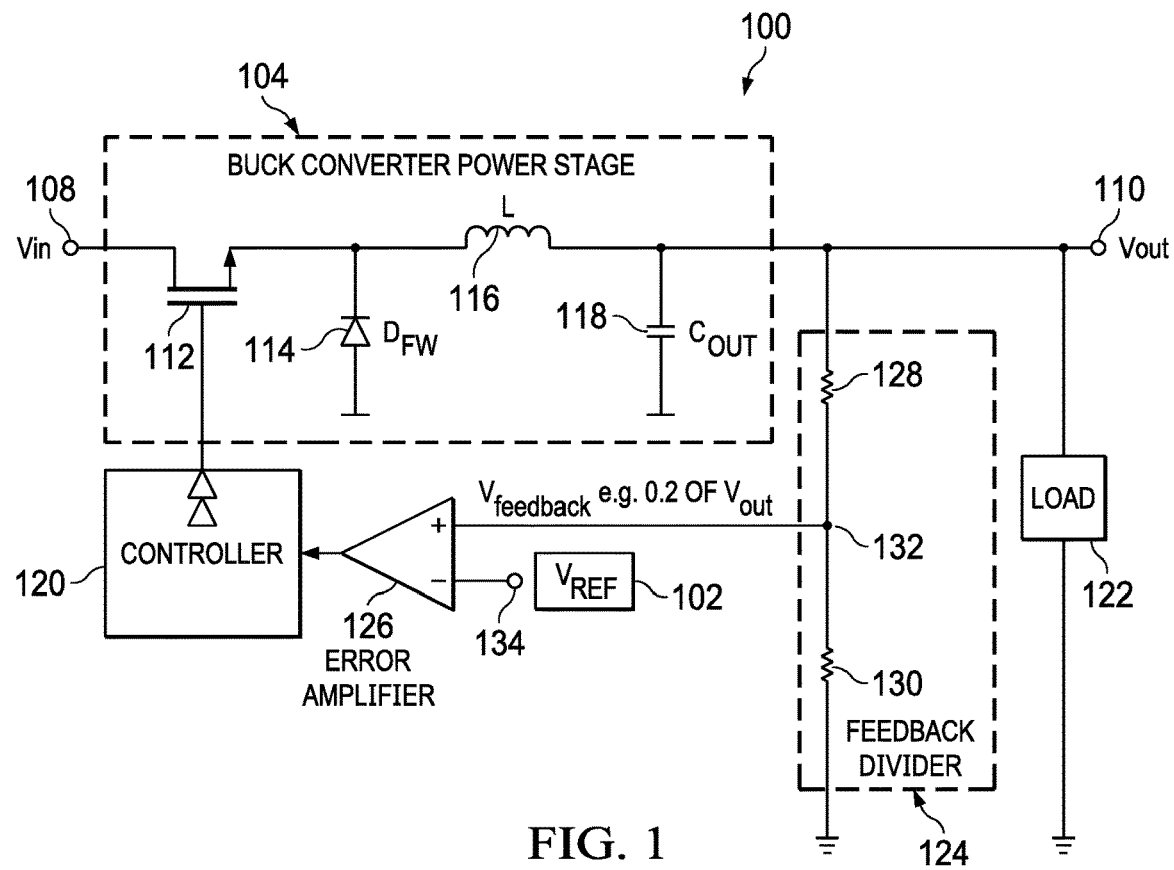
FIG. 1 is a schematic illustration of an example power conversion system including a reference voltage generation circuit.

The figures are not to scale. In general, the same reference numbers will be used throughout the drawing(s) and accompanying written description to refer to the same or like parts. As used herein, connection references (e.g., attached, coupled, connected, and joined) are to be construed in light of the specification and, when pertinent, the surrounding claim language. Construction of connection references in the present application shall be consistent with the claim language and the context of the specification, which describes the purpose for which various elements are connected or coupled. As such, connection references do not necessarily infer that two elements are directly connected or directly coupled and in fixed relation to each other.

The term "couple" is used throughout the specification. The term may cover connections, communications, or signal paths that enable a functional relationship consistent with the description of the present disclosure. For example, if device A generates a signal to control device B to perform an action, in a first example device, A is coupled to device B by direct connection, or in a second example device, A is coupled to device B through intervening component C if intervening component C does not alter the functional relationship between device A and device B such that device B is controlled by device A via the control signal generated by device A.

Consistent with the present disclosure, the term "configured to" purports to describe the structural and functional characteristics of one or more tangible non-transitory components. For example, the term "configured to" can be understood as having a particular configuration that is designed or dedicated for performing a certain function. Within this understanding, a device is "configured to" perform a certain function if such a device includes tangible non-transitory components that can be enabled, activated, or powered to perform that certain function. While the term "configured to" may encompass the notion of being configurable, this term should not be limited to such a narrow definition. Thus, when used for describing a device, the term "configured to" does not require the described device to be configurable at any given point of time.

Moreover, the term "example" is used herein to mean serving as an instance, illustration, etc., and not necessarily as advantageous. Also, although the disclosure has been shown and described with respect to one or more implementations, equivalent alterations and modifications will be apparent upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

Various circuit topologies rely on a reliable reference voltage to operate. For instance, a power converter, such as a direct current (DC) to DC converter (i.e., a DC/DC power converter), uses a reference voltage to control an output voltage and/or current and/or to regulate internal supply voltage rails of the power converter. In some power converters, silicon transistors, such as silicon bipolar junction transistors (BJTs), can be used to build a bandgap reference circuit to generate the reference voltage.

Gallium nitride devices used for switching operations are desirable due to their ability to effectuate relatively high-switching frequencies. In enhancement mode GaN processes, there are no GaN bipolar junctions that can be used to build a reference circuit. For instance, depletion mode devices and/or P-type GaN devices may not be available to build the reference circuit. In some instances, building reference circuits based on absolute parameters of GaN devices, such as conductance or threshold voltage (i.e., VGS(TH)), may generate wide variations in the resulting references voltages.

For instance, (1) a first reference circuit including a first GaN device from a first portion of a semiconductor wafer may generate a first reference voltage based on a first threshold voltage of the first GaN device and (2) a second reference circuit including a second GaN device from a second portion of the semiconductor wafer may generate a second reference voltage based on a second threshold voltage of the second GaN device. In such instances, there may be a relatively large difference between the first threshold voltage and the second threshold voltage based on process variations associated with the portions of the semiconductor wafer. Accordingly, the first and second reference circuits may generate wide variations in reference voltages in response to wide variations in absolute parameters of the GaN devices, which the wide variations in the absolute parameters can be based on the process variations. As a result, the reference voltages may not be consistent from reference circuit to reference circuit.

Some integrated circuits include a reference circuit including a depletion mode GaN device (e.g., a GaN field-effect transistor (FET)) to generate a negative voltage reference (e.g., $V_{REF}$) with respect to a known voltage (e.g., VDD). Such reference circuits rely on an absolute parameter of the depletion mode GaN device, such as VGS(TH). However, such reference circuits may not be used in many applications that require a positive voltage reference with respect to a global reference net ground. In addition, relatively large variations in $V_{REF}$ can be observed between different reference circuits, which can cause variation in operation between the different reference circuits.

Some integrated circuits generate a reference voltage with an external component, such as a Zener diode. Relatively large variations exist among instances of the external components (e.g., variations in conductance, break-down voltage, etc.), which can cause relatively large, and sometimes unacceptable, variations in generated reference voltages. An additional drawback is that the external component, such as the Zener diode, can occupy one or more pins of the integrated circuits, which reduces the number of pins available for other components that can be coupled to the integrated circuits and, thus, can reduce performance or breadth of functionality of the integrated circuits. Accordingly, the external component can also consume a relatively large portion of a die area associated with the integrated circuits.

Some integrated circuits generate reference voltages using switching capacitor circuits. Switches in such switching capacitor circuits include P-type devices and implemented in silicon (e.g., silicon P-type FETs), which can limit the switching frequencies that such integrated circuits can operate. Accordingly, such integrated circuits may operate with reduced performance compared to integrated circuits implemented with GaN processes.

Examples disclosed herein include reference voltage generation circuits using enhancement mode (E-mode) GaN devices. In some disclosed examples, a reference voltage generation circuit includes a switching capacitor circuit to generate a reference voltage by extracting a subthreshold slope of an E-mode GaN high-electron-mobility transistor (HEMT) using correlated double sampling off of a gate-to-source voltage at different drain current densities. For example, the switching capacitor circuit, at a first phase, can sample a larger gate-to-source voltage (VGS) of the E-mode GaN HEMT based on a higher drain current. In such examples, the switching capacitor circuit, at a second phase different from the first phase, can sample a smaller VGS of the E-mode GaN HEMT based on a lower drain current.

Examples disclosed herein can generate the reference voltage based on a difference between the larger VGS and the smaller VGS. In some disclosed examples, by generating the reference voltage using a single E-mode GaN HEMT, variations associated with requiring matching devices, or instances of the same devices that are intended to have substantially the same electrical characteristics or parameters, are reduced and/or otherwise eliminated.

Advantageously, examples disclosed herein generate the reference voltage based on a relative parameter (e.g., a difference between the larger VGS and the smaller VGS), which has reduced variation with respect to process manufacturing and/or temperature, compared to generating the reference voltage based on an absolute parameter (e.g., a VGS(TH) of a transistor), which has increased variation with respect to process manufacturing and/or temperature. In some disclosed examples, the reference voltage is a positive reference voltage and, advantageously, can be generated without a PN junction.

Examples disclosed herein generate a reference voltage (e.g., a positive reference voltage) without depletion mode GaN devices and/or external device(s) to an integrated circuit, such as a Zener diode. Advantageously, by not including an external device(s), examples disclosed herein can operate with reduced power consumption compared to integrated circuits that are in circuit with the external device(s).

FIG. 1 is a schematic illustration of an example power conversion system 100 including a first example reference voltage generation circuit 102. The first reference voltage generation circuit 102 is a reference circuit that, when invoked, can generate a reference voltage for use by an electrical device, component, etc. The power conversion system 100 of the example of FIG. 1 is an integrated circuit that includes an example power converter 104. The power converter 104 is a buck converter (e.g., a buck converter power stage). Alternatively, the first reference voltage generation circuit 102 may be used with and/or otherwise in connection with any other type of power converter, such as a boost converter, a buck-boost converter, etc., and/or a combination thereof.

The power conversion system 100 includes the power converter 104 to step down and/or otherwise decrease an input voltage (Vin) at a first terminal 108 to generate an output voltage (Vout) at a second terminal (e.g., an output terminal) 110. For example, the first terminal 108 and/or the second terminal 110 can be a leg, a pin, or any other type of conducting member of an integrated circuit.

The power converter 104 includes an example transistor 112, an example diode (DFW) 114, an example inductor (L) 116, and an example capacitor ($C_{OUT}$) 118. Alternatively, the power converter 104 may not include the inductor 116. For example, the power converter 104 can include inductor terminals, at which the inductor 116 can be coupled during a different stage of manufacture or integration of the power conversion system 100. The transistor 112 is a N-type FET (e.g., an N-channel FET), such as a silicon N-type FET, a GaN N-type FET, etc. Alternatively, the transistor 112 may be any other type of transistor (e.g., a P-type FET, a P-type BJT, an N-type BJT (e.g., a silicon N-type BJT, a GaN N-type BJT, etc.).

The power conversion system 100 includes an example controller 120, an example load 122, an example feedback divider circuit 124, and an example amplifier 126. The feedback divider circuit 124 is a voltage divider circuit that includes a first example resistor 128 and a second example resistor 130. Alternatively, the load 122 may not be included in the power conversion system 100. For example, the power conversion system 100 can include load terminals, at which the load 122 can be coupled during a different stage of manufacture or integration of the power conversion system 100.

The load 122 is a battery (e.g., a lithium-ion battery) of an electric vehicle (EV), a hybrid-electric vehicle (HEV), etc. For example, the power converter 104, and/or, more generally, the power conversion system 100, can deliver power to the battery to charge the battery. In other examples, the load 122 can be a different type of EV/HEV component or system, such as an electronic control unit (ECU), an electric motor, a traction inverter, etc., and/or a combination thereof. In yet other examples, the load 122 can be hardware, such as a processor (e.g., a central processing unit (CPU)) of a computing system (e.g., an Internet-enabled smartphone or tablet, a desktop computer, a server, etc.).

The controller 120 is hardware. For example, the controller 120 can be a microcontroller, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). Alternatively, the controller 120 may be hardware logic, machine readable instructions, hardware implemented state machines, and/or any combination thereof.

In example operating conditions, the controller 120 can turn on the transistor 112 to cause a positive voltage (Vin−Vout) across the inductor 116. The current flowing through the inductor 116 towards the second terminal 110 and the load 122 increases causing energy to be stored in the inductor 116. In example operating conditions, the controller 120 can turn off the transistor 112. As the current in the inductor 116 cannot change instantly, the inductor 116 forces the current to go through the diode 114, which has an anode terminal coupled to the global reference net ground (GND). Thereby, a (negative) voltage of ($-VD_{fw}$–Vout) is applied across the inductor 116 and the current towards the second terminal 110 and the load 122 decreases. The capacitor 118 is used to store energy and reduce the current and voltage ripple caused by the increasing and decreasing inductor current to provide a constant DC voltage/current to the load 122. The feedback divider circuit 124 generates a feedback voltage ($V_{feedback}$) at an example node 132. The feedback voltage at the node 132 is based on Vout at the second terminal 110. For example, the feedback divider circuit 124 can generate the feedback voltage to be a portion of Vout (e.g., 0.1 of Vout, 0.2 of Vout, etc.).

The power conversion system 100 of the example of FIG. 1 includes the controller 120 to control switching operations (e.g., turn off, turn on, etc.) of the transistor 112 based on an output of the amplifier 126 (e.g., an amplifier output). The amplifier 126 includes a first input (e.g., a first amplifier input) (designated with a "+" symbol) and a second input (e.g., a second amplifier input) (designated with a "−" symbol). The first input is coupled to the node 132 and the second input is coupled to the first reference voltage generation circuit 102 at an example reference voltage terminal 134.

The amplifier 126 is an error amplifier that generates a control signal (e.g., a current, a voltage, etc.) in response to comparing the feedback voltage at the node 132 to a reference voltage generated by the first reference voltage generation circuit 102. For example, the controller 120 can adjust a switching frequency of the transistor 112, a duty cycle of the power converter 104, etc., based on the control signal generated by the amplifier 126.

Figure 2:
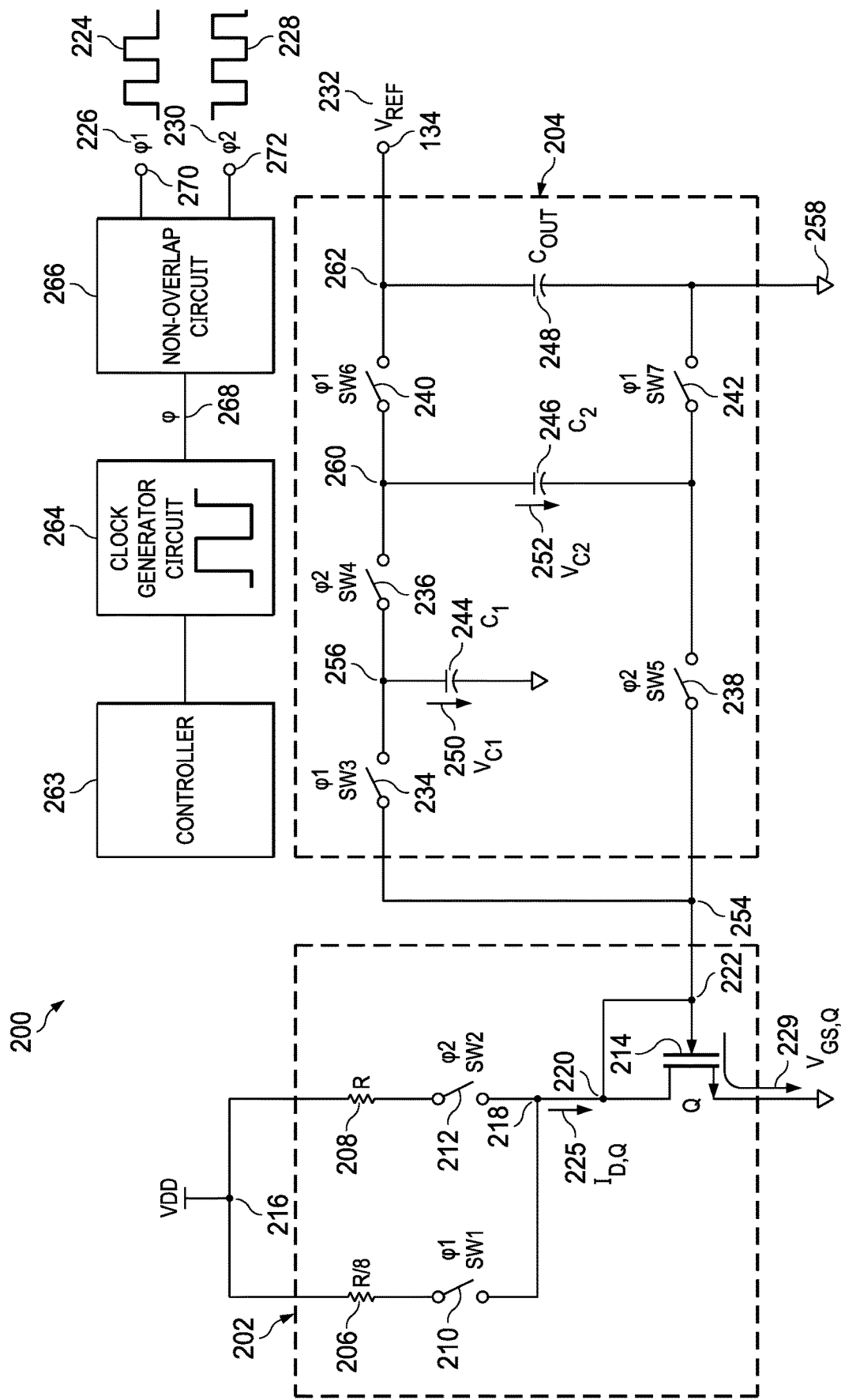
FIG. 2 is an example implementation of the reference voltage generation circuit of FIG. 1.

FIG. 2 is a second example reference voltage generation circuit 200. The second reference voltage generation circuit 200 of FIG. 2 can be an example implementation of the first reference voltage generation circuit 102 of FIG. 1. The second reference voltage generation circuit 200 includes a first example voltage generator circuit 202 and an example switching capacitor circuit 204.

The second reference voltage generation circuit 200 includes the first voltage generator circuit 202 to generate a voltage, such as a gate-to-source voltage (VGS), based on a drain current flowing through a transistor. The first voltage generator circuit 202 includes a first example resistor (R/8) 206, a second example resistor (R) 208, a first example switch (SW1) 210, a second example switch (SW2) 212, and an example GaN transistor (Q) 214.

First ends of the first resistor 206 and the second resistor 208 are coupled to a voltage supply rail (VDD) at an example voltage supply rail node 216. A second end of the first resistor 206 is coupled to a first terminal (e.g., a current terminal, such as a drain terminal or source terminal of a transistor) of SW1 210. A second end of the second resistor 208 is coupled to a first terminal (e.g., a current terminal, such as a drain terminal or source terminal of a transistor) of SW 212.

Second terminals (e.g., a current terminal, such as a drain terminal or source terminal of a transistor) of SW1 210 and SW2 212 are coupled to each other and a drain (e.g., a drain terminal) of the transistor 214 at a first example node 218. The drain of the transistor 214 is coupled to a gate (e.g., a gate terminal) of the transistor 214 at an example drain node 220 and an example gate node 222.

The first resistor 206 has a first resistance and the second resistor 208 has a second resistance, which is eight times greater than the first resistance. Alternatively, the first resistor 206 and/or the second resistor 208 may have any other resistance. The SW1 210 is controlled by a first example clock signal 224 having a first example phase ($\varphi_1$) 226. SW2 212 is controlled by a second example clock signal 228 having a second example phase ($\varphi_2$) 230.

The first clock signal 224 and the second clock signal 228 are control signals, command signals, instruction signals, etc. The first phase 226 and the second phase 230 are different and/or otherwise out-of-phase to each other. For example, the first phase 226 and the second phase 230 can be 180-degrees out-of-phase. Alternatively, the first phase 226 and the second phase 230 may be a different quantity of degrees out-of-phase from each other. The non-overlap circuit 266 generates the first clock signal 224 and the second clock signal 228 to not be asserted high at the same time.

The GaN transistor 214 is an enhancement mode (E-mode) high-electron-mobility transistor (HEMT) GaN transistor. In example operating conditions, the GaN transistor 214 of FIG. 2 can have an example drain current ($I_{D,Q}$) 225 and an example gate-to-source voltage ($V_{GS,Q}$) 220.

The second reference voltage generation circuit 200 includes the switching capacitor circuit 204 to sample $V_{GS,Q}$ 229 from the first voltage generator circuit 202 and process $V_{GS,Q}$ 229 into an example reference voltage ($V_{REF}$) 232 at the reference voltage terminal 134 of FIG. 1. The switching capacitor circuit 204 includes a third example switch (SW3) 234, a fourth example switch (SW4) 236, a fifth example switch (SW5) 238, a sixth example switch (SW6) 240, a seventh example switch (SW7) 242, a first example capacitor (C1) 244, a second example capacitor (C2) 246, and a third example capacitor ($C_{OUT}$) 248.

SW3 234, SW6 240, and SW7 242 are controlled by the first clock signal 224. SW4 236 and SW5 238 are controlled by the second clock signal 228. C1 244 has a first voltage ($V_{C1}$) 250, C2 246 has a second voltage ($V_{C2}$) 252, and $C_{OUT}$ 248 has a third voltage, which is $V_{REF}$ 232 and is also at the reference voltage terminal 134.

The gate of the transistor 214 is coupled to first terminals of SW3 234 and SW5 238 at a second example node 254. A second terminal of SW3 234 is coupled to a first plate of C1 244 and a first terminal of SW4 236 at a third example node 256. A second plate of C1 244 is coupled to an example reference rail (e.g., a ground rail) 258. A second terminal of SW4 236 is coupled to a first plate of C2 246 and a first terminal of SW6 240 at a fourth example node 260. A second terminal of SW6 240 is coupled to a first plate of $C_{OUT}$ 248 and the reference voltage terminal 134 at a fifth example node 262. A second terminal of SW5 238 is coupled to a second plate of C2 246 and a first terminal of SW7 242. A second terminal of SW7 242 is coupled to a second plate of $C_{OUT}$ 248 and the reference rail 258.

The clock signals 224, 228 are generated by an example controller 263, an example clock generator circuit 264, and an example non-overlap circuit 266. An output of the controller 263 is coupled to an input of the clock generator circuit 264. An output of the clock generator circuit 264 is coupled to an input of the non-overlap circuit 266.

The controller 263 is hardware. For example, the controller 263 can be a microcontroller, one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)). Alternatively, the controller 263 may be hardware logic, machine readable instructions, hardware implemented state machines, and/or any combination thereof. In some examples, the controller 263 of FIG. 2 can correspond to and/or otherwise be an example implementation of the controller 120 of FIG. 1.

The controller 263 commands, instructs, and/or otherwise invokes the clock generator circuit 264 to generate a clock signal having a third example phase ((p) 268. The clock generator circuit 264 generates the clock signal having the third phase 268 and transmits the clock signal to the non-overlap circuit 266. The non-overlap circuit 266 can generate the clock signals 224, 228 based on the clock signal. For example, the non-overlap circuit 266 can generate the clock signals 224, 228 to not overlap with each other and/or otherwise be out-of-phase with each other. In such examples, the non-overlap circuit 266 can generate the first clock signal 224 to be 180-degrees out-of-phase with the second clock signal 228.

The non-overlap circuit 266 has a first example output terminal 270 and a second example output terminal 272. The non-overlap circuit 266 can generate the first clock signal 224 at the first output terminal 270 and the second clock signal 228 at the second output terminal 272. For example, the first output terminal 270 can be coupled to a terminal (e.g., a control terminal, a gate terminal, etc.) of SW1 210, SW3 234, SW6 240 and SW7 242. In such examples, the first output terminal 270 can be coupled to a gate terminal of one or transistors that can implement SW1 210. In other examples, the second output terminal 272 can be coupled to a terminal (e.g., a control terminal, a gate terminal, etc.) of SW2 212, SW4 236, and SW5 238.

SW1 210, SW2 212, SW3 234, SW4 236, SW5 238, SW6 240, and SW7 242 are each implemented by one or more transistors. For example, SW1 210, SW2 212, SW3 234, SW4 236, SW5 238, SW6 240, and/or SW7 242 can be implemented by one or more FETs, metal-oxide-semiconductor FETs (MOSFETs), BJTs, etc., and/or a combination thereof. In such examples, the one or more FETs, MOSFETs, BJTS, etc., can be N-channel, P-channel, etc., and/or a combination thereof. In some such examples, the one or more FETs, MOSFETs, BJTs, etc., can be silicon, GaN, or silicon carbide (SiC) FETs, MOSFETs, BJTS, etc., and/or a combination thereof.

In example operating conditions, the non-overlap circuit 266 asserts the first clock signal 224, which closes SW1 210 and SW3 234, and de-asserts the second clock signal 228, which opens SW2 212, SW4 236, and SW5 238. For example, in response to asserting the first clock signal 224, a transistor that implements SW1 210 can close by conducting current and/or otherwise being enabled. In such examples, in response to de-asserting the second clock signal 228, a transistor that implements SW2 212 can open by not conducting current and/or otherwise being disabled.

In example operating conditions, in response to closing SW1 210, a first quantity of the drain current 225 flows from VDD through the first resistor 206, SW1 210, and the transistor 214. In response to the first quantity of the drain current 225 flowing through the transistor 214, the transistor 214 generates a first gate-to-source voltage (VGS1), or $V_{GS,Q}$ 229 having a first value. In response to closing SW3 234, C1 244 samples VGS1 and/or otherwise transfers VGS1 onto the first plate of C1 244. As the second plate of C1 244 is coupled to the reference rail 258, $V_{C1}$ 250 is and/or otherwise corresponds to VGS1.

In example operating conditions, the non-overlap circuit 266 de-asserts the first clock signal 224, which opens SW1 210, SW3 234, SW6 240, and SW7 242, and asserts the second clock signal 228, which closes SW2 212, SW4 236, and SW5 238. In response to closing SW2 212, a second quantity of the drain current 225 flows from VDD through the second resistor 208, SW2 212, and the transistor 214. The second quantity of the drain current 225 is less than the first quantity of the drain current 225 because the second resistance of the second resistor 208 is greater than the first resistance of the first resistor 206. In response to the second quantity of the drain current 225 flowing through the transistor 214, the transistor 214 generates a second gate-to-source voltage (VGS2), or $V_{GS,Q}$ 229 having a second value. In such example operating conditions, VGS2 is less than VGS1 because the second quantity of the drain current 225 is less than the first quantity of the drain current 225. In some such example operating conditions, VGS1 and VGS2 are less than a threshold voltage (VGS(TH)) of the transistor 214, which corresponds to sub-threshold operation of the transistor 214. For example, VGS1 and VGS2 can be generated in response to the transistor 214 operating in the subthreshold.

In response to opening SW3 234 and closing SW4 236, the first plate of C2 246 samples VGS1 from C1 244 and/or otherwise transfers VGS1 from C1 244 onto the first plate of C2 246. In response to closing SW5 238, the second plate of C2 246 samples VGS2 from the gate of the transistor 214 and/or otherwise transfers VGS2 from the gate of the transistor 214 to the second plate of C2 246. As a result, $V_{C2}$ 252 is a difference (e.g., a voltage difference) between VGS1 and VGS2 and/or otherwise is a relative difference between gate-to-source voltages.

In example operating conditions, the non-overlap circuit 266 de-asserts the second clock signal 228, which opens SW4 236 and SW5 238, and asserts the first clock signal 224, which closes SW6 240 and SW7 242. In response to closing SW6 240, $C_{OUT}$ 248 samples the voltage difference from C2 246. In response to closing SW7 242, the second plate of C2 246 is coupled to the reference rail 258, which discharges the second plate of C2 246. Advantageously, $C_{OUT}$ 248 sampling the voltage difference refreshes the voltage difference to reduce noise (e.g., switching noise) associated with switching operations of SW6 240, SW7 242, and/or any other switch of the second reference voltage generation circuit 200 of the example of FIG. 2.

In response to $C_{OUT}$ 248 sampling the voltage difference, $C_{OUT}$ 248 can deliver the voltage difference to the reference voltage terminal 134 as $V_{REF}$ 232. For example, $C_{OUT}$ 248, and/or, more generally, the switching capacitor circuit 204, can deliver $V_{REF}$ 232 to the amplifier 126 of FIG. 1. In such examples, the controller 120 of FIG. 1 can control whether to turn on or off transistor 112 of FIG. 1 in response to obtaining a control signal generated by the amplifier 126 based on $V_{REF}$ 232 from $C_{OUT}$ 248.

Figure 3:
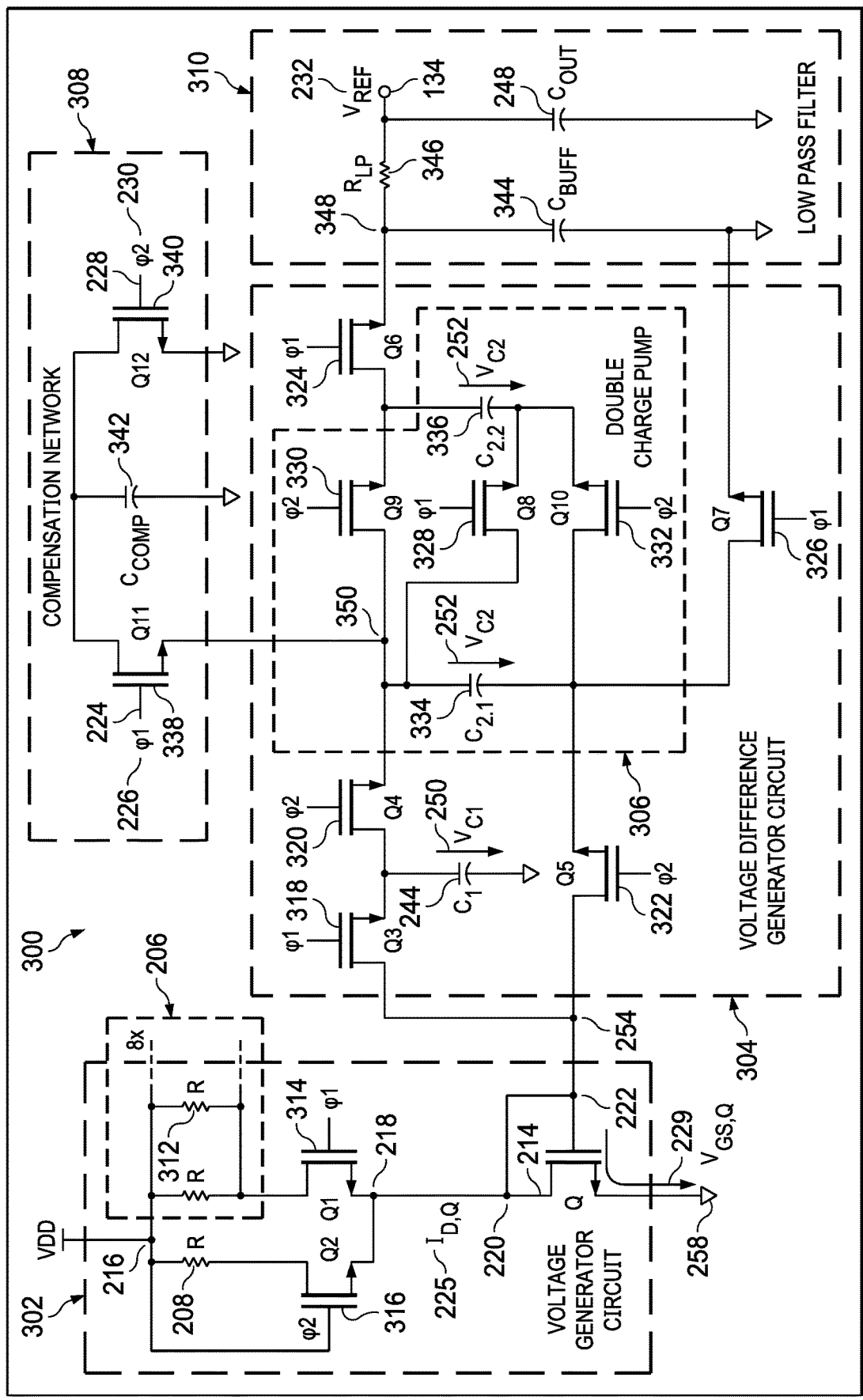
FIG. 3 is an example implementation of the reference voltage generation circuit of FIGS. 1 and/or 2.

FIG. 3 is a third example reference voltage generation circuit 300. The third reference voltage generation circuit can be an example implementation of the first reference voltage generation circuit 102 of FIG. 1 and/or the second reference voltage generation circuit 200 of FIG. 2. The third reference voltage generation circuit 300 includes a second example voltage generator circuit 302, an example voltage difference generator circuit 304, which includes an example charge pump (e.g., a charge pump circuit, a doubler charge pump, a doubler charge pump circuit, etc.) 306, an example compensation network 308, and an example low pass filter 310.

The second voltage generator circuit 302 is coupled to the voltage difference generator circuit 304. The doubler charge pump 306, and/or, more generally, the voltage difference generator circuit 304, is coupled to the compensation network 308. The voltage difference generator circuit 304 is coupled to the low pass filter 310. The low pass filter 310, and/or, more generally, the third reference voltage generation circuit 300 is coupled to one or more components in an integrated circuit, such as the amplifier 126 of FIG. 1. The second voltage generator circuit 302 can be an example implementation of the first voltage generator circuit 202 of FIG. 2. The doubler charge pump 306, and/or, more generally, the voltage difference generator circuit 304, can be an example implementation of the switching capacitor circuit 204 of FIG. 2.

The third reference voltage generation circuit 300 includes the second voltage generator circuit 302 to generate a voltage, such as a VGS of a transistor (e.g., the transistor 214), based on a drain current flowing through the transistor. The second voltage generator circuit 302 includes first resistors 312, the second resistor 208 of FIG. 2, a first example GaN transistor (Q1) 314, a second example GaN transistor (Q2) 316, and the transistor 214 of FIG. 2. The first resistors 312 include eight resistors in parallel with each of the eight resistors having the same resistance (R). The first resistors 312 can be an example implementation of the first resistor 206 of FIG. 2. The first GaN transistor 314 can be an example implementation of SW1 210 of FIG. 2. The second GaN transistor 316 can be an example implementation of SW2 212 of FIG. 2.

First ends of the first resistors 312 and the second resistor 208 are coupled to VDD at the voltage supply rail node 216 of FIG. 2. Second ends of the first resistors 312 are coupled to a current terminal (e.g., a drain terminal) of Q1 314. A second end of the second resistor 208 is coupled to the drain terminal of Q2 316. Current terminals (e.g., source terminals) of Q1 314 and Q2 316 are coupled to the first node 218 of FIG. 2. The gate of the transistor 214 is coupled to the drain terminal of Q3 318 and the drain terminal of Q5 322, and/or, more generally, the voltage difference generator circuit 304, at the second node 254.

The third reference voltage generation circuit 300 includes the voltage difference generator circuit (e.g., a delta generator circuit, a delta generation circuit, etc.) 304 to generate and/or otherwise determine a voltage difference (e.g., ΔVGS) between (1) a first VGS of the transistor 214 in response to a first drain current density (e.g., a first quantity of drain current flowing through the transistor 214) and (2) a second VGS of the transistor 214 in response to a second drain current density (e.g., a second quantity of drain current flowing through the transistor 214. The voltage difference generator circuit 304, and/or, more generally, the third reference voltage generation circuit 300 includes the doubler charge pump 306 to double and/or otherwise increase ΔVGS. For example, the voltage difference generator circuit 304 can generate ΔVGS based on a difference between VGS1 and VGS2 associated with the transistor 214, and the doubler charge pump 306 can double ΔVGS to generate 2*ΔVGS. In such examples, 2*ΔVGS can be used by integrated circuit components, such as the amplifier 126 of FIG. 1, that may require a higher voltage level than ΔVGS for operation.

The voltage difference generator circuit 304 includes C1 244 of FIG. 2, a third example GaN transistor (Q3) 318, a fourth example GaN transistor (Q4) 320, a fifth example GaN transistor (Q5) 322, a sixth example GaN transistor (Q6) 324, a seventh example GaN transistor (Q7) 326, and the doubler charge pump 306. Q3 318 can be an example implementation of SW3 234 of FIG. 2. Q4 320 can be an example implementation of SW4 236 of FIG. 2. Q5 322 can be an example implementation of SW5 238 of FIG. 2. Q6 324 can be an example implementation of SW6 240 of FIG. 2. Q7 326 can be an example implementation of SW7 242 of FIG. 2.

The source terminal of Q3 318 is coupled to a first plate of C1 244 and the drain terminal of Q4 320. A second plate of C1 244 is coupled to the reference rail 258. The source terminal of Q4 320 is coupled to a first plate of C2.1 334, the drain terminal of Q9 330, the drain terminal of Q8 328, and the source terminal of Q11 338. The source terminal of Q9 330 is coupled to a first plate of C2.2 336 and the drain terminal of Q6 324. The source terminal of Q8 328 is coupled to a second plate of C2.2 336. The source terminal of Q6 324, and/or, more generally, the voltage difference generator circuit 304, is coupled to the low pass filter 310 at a sixth example node 348. The source terminal of Q5 322 is coupled to a second plate of C2.1 334, the drain terminal of Q10 332, and the source terminal of Q7 326. The source terminal of Q8 328 is coupled to the source terminal of Q10 332 and the second plate of C2.2 336. The drain terminal of Q7 326 is coupled to a second plate of $C_{BUF}$ 344 and the reference rail 258.

The doubler charge pump 306 includes an eighth example GaN transistor (Q8) 328, a ninth example GaN transistor (Q9) 330, a tenth example GaN transistor (Q10) 332, a third example capacitor (C2.1) 334, and a fourth example capacitor (C2.2) 336. C2.1 334 and C2.2 336 can be an example implementation of C2 246 of FIG. 2.

The third reference voltage generation circuit 300 includes the compensation network 308 to compensate for bottom-plate losses associated with at least one of C2.1 334 or C2.2 336. The compensation network 308 includes an eleventh example GaN transistor (Q11) 338, a twelfth example GaN transistor (Q12) 340, and an example compensation capacitor ($C_{COMP}$) 342. Q 214, Q1 314, Q2 316, Q3 318, Q4 320, Q5 322, Q6 324, Q7 326, Q8 328, Q9 330, Q10 332, Q11 338, and Q12 340 are E-mode HEMT GaN transistors, and/or, more generally, switches configured to switch in response to one of the clock signals 224, 228 of FIG. 2 (e.g., in response to an assertion, a de-assertion, etc., of one of the clock signals 224, 228).

A source terminal of Q11 338 is coupled to the doubler charge pump 306, and/or, more generally, the voltage difference generator circuit 304, at a seventh example node 350. For example, the source terminal of Q11 338 is coupled to the source terminal of Q4 320, the drain terminal of Q8 328, the drain terminal of Q9 330, and the first plate of C2.1 334. A drain terminal of Q11 338 is coupled to a first plate of CCOMP 342 and a drain terminal of Q12 340. A second plate of CCOMP 342 and a source terminal of Q12 340 is coupled to the reference rail 258.

The third reference voltage generation circuit 300 includes the low pass filter 310 to minimize and/or otherwise reduce a ripple of $V_{REF}$ 232 generated by the third reference voltage generation circuit 300. The low pass filter 310 includes $C_{OUT}$ 248 of FIG. 2, an example buffer capacitor ($C_{BUF}$) 344, and an example resistor (e.g., a low-pass resistor (RLP)) 346. For example, $C_{BUF}$ 344 and RLP 346 can form a resistor-capacitor (RC) network to filter high-frequencies generated by the third reference voltage generation circuit 300 to reduce the ripple of $V_{REF}$ 232.

A first plate of $C_{BUF}$ 344 is coupled to the source terminal of Q6 324 and a first end of RLP 346. A second end of RLP 346 is coupled to the first plate of $C_{OUT}$ 248 and the reference voltage terminal 134. The second plate of $C_{OUT}$ 248 is coupled to the reference rail 258.

Q1 314, Q3 318, Q6 324, Q7 326, Q8 328, and Q11 338 are controlled by the first clock signal 224 of FIG. 2 having the first phase 226 of FIG. 2. Q2 316, Q4 320, Q5 322, Q9 330, Q10 332, and Q12 340 are controlled by the second clock signal 228 having the second phase 230 of FIG. 2.

In example operating conditions, Q2 316 is always turned on. In example operating conditions, in response to the first clock signal 224 having the first phase 226 being asserted, Q1 314 and Q3 318 are enabled, which causes a first quantity of the drain current 225 to flow through the transistor 214 to generate a first gate-to-source voltage (VGS1). In response to generating VGS1, VGS1 is stored by C1 244 as $V_{C1}$ 250. In such example operating conditions, the first quantity of the drain current 225 flows from VDD through Q1 314, Q2 316, and Q 214.

In example operating conditions, in response to the first clock signal 224 being de-asserted and the second clock signal 228 having the second phase 230 being asserted, Q4 320, Q5 322, Q9 330, and Q10 332 are enabled with Q1 314 and Q3 318 being disabled. In such example operating conditions, $V_{C1}$ 250 is transferred to the first plates of C2.1 334 and C2.2 336 and respectively stored as $V_{C2}$ 252. In some such example operating conditions, a second quantity of the drain current 225, which is less (e.g., nine-times less) than the first quantity of the drain current 225, flows through the transistor 214 to generate a second gate-to-source voltage (VGS2), which is less than VGS1. In such example operating conditions, the second quantity of the drain current 225 flows from VDD through Q2 316 and Q 214.

In response to generating VGS2, VGS2 is transferred to the second plates of C2.1 334 and C2.2 336, which generates a voltage difference between VGS1 and VGS2 across C.2.1 334 and C2.2 336 and respectively stored as $V_{C2}$ 252 across each capacitor. Advantageously, by splitting C2 246 of FIG. 2 into C2.1 334 and C2.2 336 of FIG. 3, the third reference voltage generation circuit 300 of FIG. 3 doubles the voltage difference so that a higher value of the voltage difference can be used by different IC circuits for improved operation.

In example operating conditions, in response to the first clock signal 224 having the first phase 226 being asserted and the second clock signal 228 having the second phase 230 being de-asserted, Q6 324 and Q7 326 are enabled, which causes $V_{C2}$ 252 stored by C2.1 334 and C2.2 336 to be transferred to $C_{BUF}$ 344 and $C_{OUT}$ 248 as double $V_{C2}$ 252 (e.g., 2*$V_{C2}$ 252). In response to storing double the quantity of $V_{C2}$ 252 on $C_{OUT}$ 248 as $V_{REF}$ 232, $V_{REF}$ 232 can be delivered and/or otherwise provided to an IC component, such as the amplifier 126 of FIG. 1.

Figure 4:
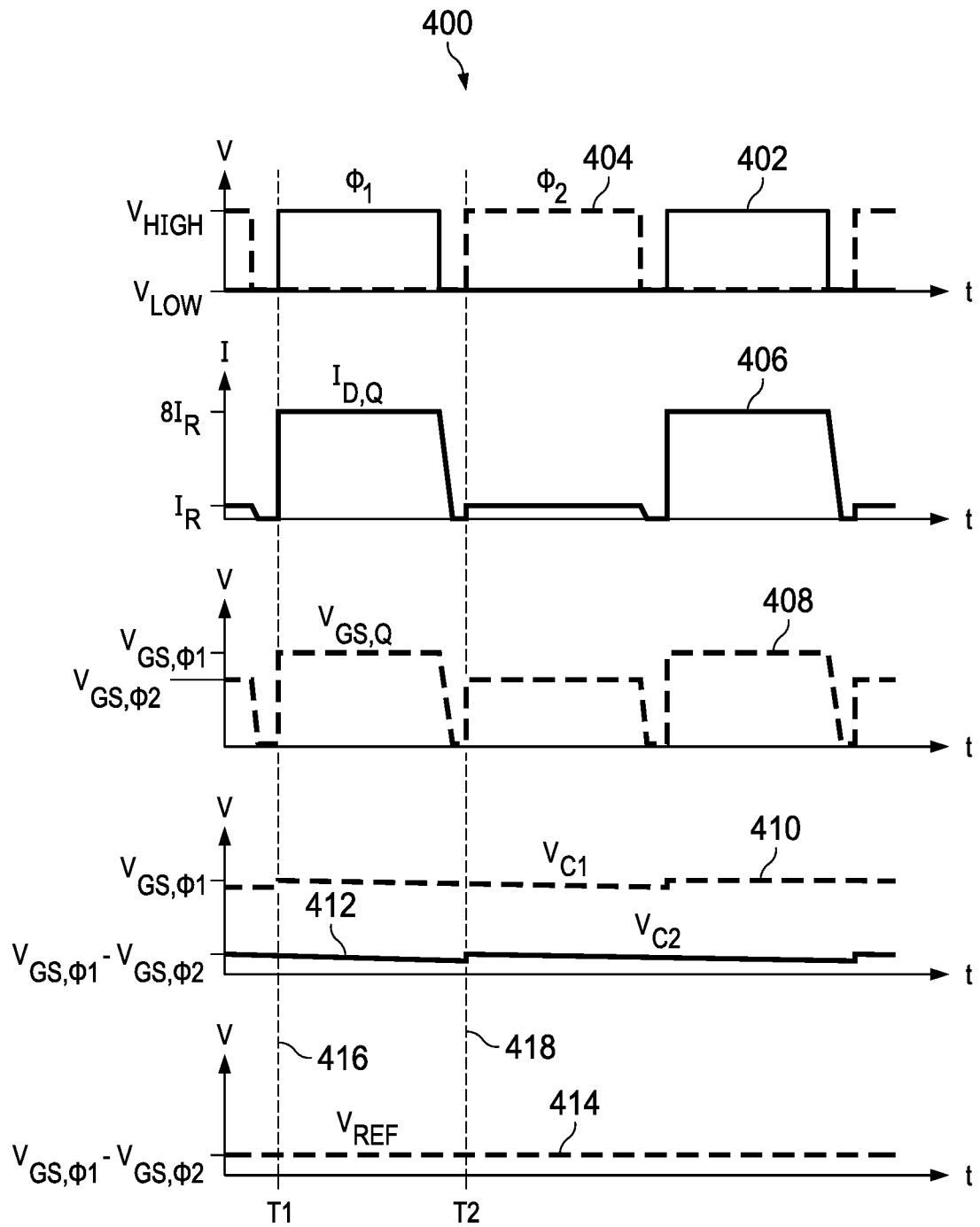
FIG. 4 is an example timing diagram of the reference voltage generation circuit of FIG. 2.

FIG. 4 is an example timing diagram 400 of the second reference voltage generation circuit 200 of FIG. 2. The timing diagram 400 of FIG. 4 includes example waveforms 402, 404, 406, 408, 410, 412, 414 including a first example waveform 402, a second example waveform 404, a third example waveform 406, a fourth example waveform 408, a fifth example waveform 410, a sixth example waveform 412, and a seventh example waveform 414.

The first waveform 402 can correspond to the first clock signal 224 of FIGS. 2 and/or 3 having the first phase 226 of FIGS. 2 and/or 3. The second waveform 404 can correspond to the second clock signal 228 of FIGS. 2 and/or 3 having the second phase 230 of FIGS. 2 and/or 3. The third waveform 406 can correspond to the drain current 225 of FIGS. 2 and/or 3 flowing through the transistor 214 of FIGS. 2 and/or 3. The fourth waveform 408 can correspond to the gate-to-source voltage 229 of FIGS. 2 and/or 3 of the transistor 214 of FIGS. 2 and/or 3. The fifth waveform 410 can correspond to $V_{C_1}$ 250 of FIGS. 2 and/or 3. The sixth waveform 412 can correspond to $V_{C_2}$ 252 of FIGS. 2 and/or 3. The seventh waveform 414 can correspond to $V_{REF}$ 232 of FIGS. 2 and/or 3.

In the timing diagram 400 of FIG. 4, at a first example time (T1) 416, the first waveform 402 is at a logic high level (VHIGH) and the second waveform 404 is at a logic low level (VLOW). At the first time 416, Q1 314 and Q3 318 of FIG. 3 are conducting and/or otherwise enabled and Q2 316, Q4 320, and Q5 322 of FIG. 3 are not conducting and/or otherwise disabled. At the first time 416, the third waveform 406 is at a first current level (8IR), which is eight times higher in quantity than a second current level (IR). The first current level is representative of a first quantity of the drain current 225 flowing through the transistor 214. In response to generating the first current level of the drain current 225, the fourth waveform 408 is at a first gate-to-source voltage level (VGS,φ1). At the first time 416, in response to generating the first gate-to-source voltage level, the fifth waveform 410 is at the first gate-to-source voltage level. For example, the first gate-to-source voltage level is stored by C1 244 of FIGS. 2 and/or 3 at the first time 416.

In the timing diagram 400 of FIG. 4, at a second example time (T2) 418, the first waveform 402 is at a logic low level (VLOW) and the second waveform 404 is at a logic high level (VHIGH). At the second time 418, Q1 314 and Q3 318 of FIG. 3 are not conducting and/or otherwise disabled and Q2 316, Q4 320, and Q5 322 of FIG. 3 are conducting and/or otherwise enabled. At the second time 418, the third waveform 406 is at the second current level (IR), which is eight times less in quantity than the first current level (8IR). The second current level is representative of a second quantity of the drain current 225 flowing through the transistor 214, which is less than the first quantity of the drain current 225. In response to generating the second current level of the drain current 225, the fourth waveform 408 is at a second gate-to-source voltage level (VGS,φ2). At the second time 418, in response to generating the second gate-to-source voltage level, the fourth waveform 408 is at the first gate-to-source voltage level and the fifth waveform 412 has a value corresponding to a voltage difference (VGS,φ1−VGS,φ2) between the first gate-to-source voltage level and the second gate-to-source voltage level. For example, the voltage difference is stored by $C_{BUF}$ 344 and/or $C_{OUT}$ 248 at the second time 418.

Advantageously, by generating the voltage difference based on two different current densities (e.g., 8IR and IR), the reference voltage generation circuits 200, 300 of FIGS. 2 and/or 3 generate a relatively stable, reliable, and/or otherwise unchanging $V_{REF}$ as depicted in the timing diagram 400 of FIG. 4. By generating $V_{REF}$ based on a relative parameter, such as the voltage difference between different gate-to-source voltages, rather than an absolute parameter, such as a gate-to-source voltage of the transistor 214 in response to a pre-defined current density, the reference voltage generation circuits 200, 300 of FIGS. 2 and/or 3 can generate $V_{REF}$ using E-mode GaN HEMT transistors.

Figure 5:
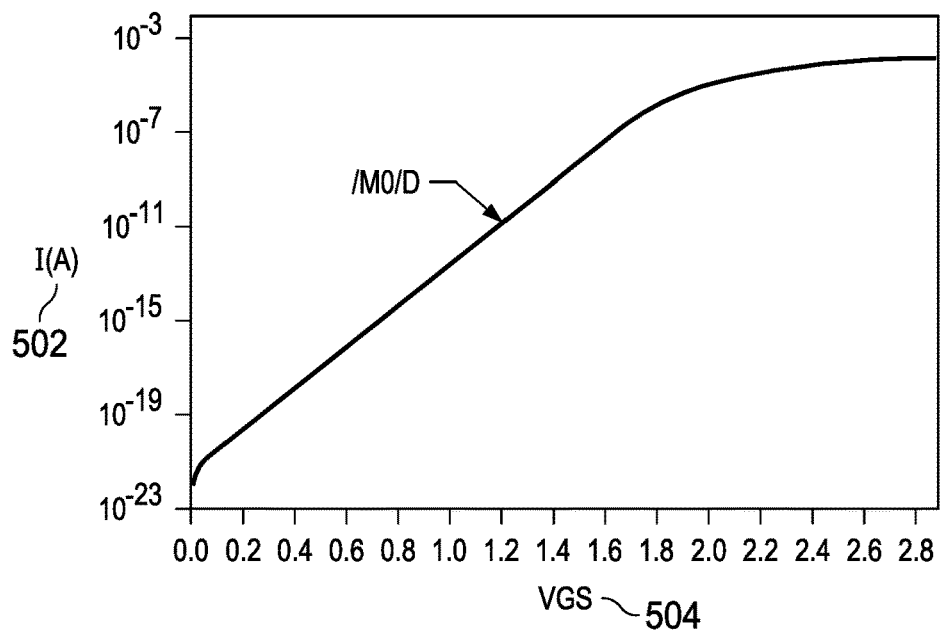
FIG. 5 is a graph depicting drain current with respect to a gate-to-source voltage of a transistor.

FIG. 5 is a graph 500 depicts an example waveform 502 representative of drain current 504 as a function (e.g., a logarithmic function) of gate-to-source voltage (VGS) 506 of a transistor, such as the transistor 214 of FIGS. 2 and/or 3. The drain current 504 is in logarithmic scale and VGS 506 is in linear scale. The subthreshold slope ΔVGS/decade is independent of absolute biasing within certain limits (e.g., drain currents in a range of $10^{-2}$ and $10^{-7}$).

Figure 6:
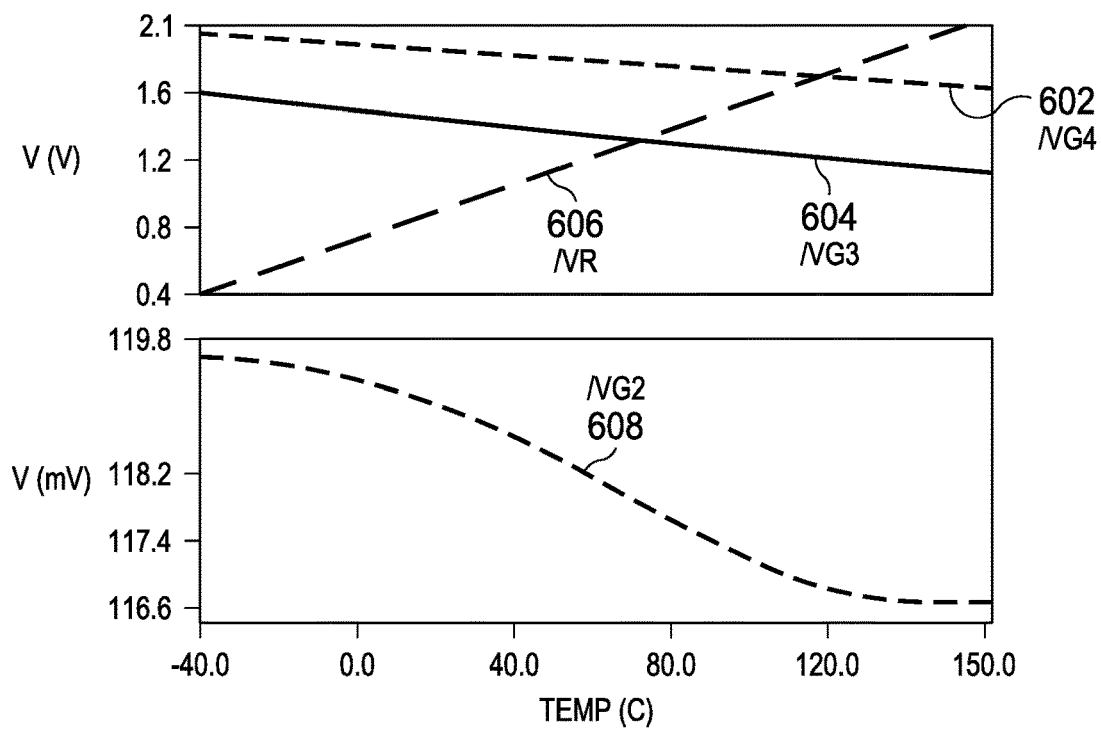
FIG. 6 is a graph depicting voltage characteristics of the reference voltage generation circuit of FIGS. 2 and/or 3 with respect to temperature.

FIG. 6 is a graph 600 depicting voltage characteristics associated with the second reference voltage generation circuit 200 of FIG. 2 and/or the third reference voltage generation circuit 300 of FIG. 3 with respect to temperature. The graph 600 of FIG. 6 depicts example waveforms 602, 604, 606, 608 including a first example waveform 602, a second example waveform 604, a third example waveform 606, and a fourth example waveform 608.

The first waveform 602 can correspond to VGS,φ1 of FIG. 4, $V_{C_1}$ 250 of FIGS. 2-3, etc., with respect to temperature. For example, the first waveform 602 can correspond to a first gate-to-source voltage generated by the transistor 214 of FIGS. 2-3, which is biased with a drain current density of 1 microampere (uA) per micrometer (um) channel width of the transistor 214. The slope of the first waveform 602 corresponds to the temperature coefficient, which is in absolute numbers approximately −2 millivolts (mV) per degrees Kelvin (K). The temperature coefficient of −2 mV/K leads to a relative slope of approximately −1000 parts-per-million (ppm)/K with respect to the voltage at room temperature (e.g., approximately 27 degrees Centigrade (C)).

The second waveform 604 can correspond to VGS,φ2 of FIG. 4, $V_{C_2}$ 252 of FIGS. 2-3, etc., with respect to temperature. For example, the second waveform 604 can correspond to a second gate-to-source voltage generated by the transistor 214 of FIGS. 2-3, which is biased with a drain current density of 1 nanoamperes (nA) per um channel width. The slope of the second waveform 604 corresponds to the temperature coefficient, which is in absolute numbers approximately −2 mV/K. The temperature coefficient of −2 mV/K leads to a relative slope of approximately −1800 ppm/K with respect to the voltage at room temperature (e.g., approximately 27 degrees Centigrade (C)).

The third waveform 606 is a voltage that corresponds to a resistance of the second resistor 208 of FIG. 2, one(s) of the first resistors 312 of FIG. 3, etc., with respect to temperature, which is biased with a current density of 1 uA per um resistor width. The slope of the third waveform 606 corresponds to the temperature coefficient, which is in absolute numbers approximately +10 mV/K. The temperature coefficient of +10 mV/K leads to a relative slope of approximately 9000 ppm/K with respect to the value at room temperature (e.g., approximately 27 degrees Centigrade (C)).

The voltages of the first waveform 602, the second waveform 604, and the third waveform 606 are absolute values with relatively large temperature coefficients. The fourth waveform 608 is the subthreshold slope of a transistor, which is extracted by determining a voltage difference of two gate-to-source voltages of a transistor generated by the transistor when biased with two different drain-current densities. The two different drain-current densities can be 0.1 picoampere (pA) per um channel width and 1 pA/um channel width. As the fourth waveform 608 corresponds to a difference between the two gate-to-source voltages, the fourth waveform 608 is representative of a relative parameter. In the full temperature range, the fourth waveform 608 can have an average slope of −0.02 mV/K leading to a relative slope and temperature coefficient of approximately 200 ppm/K with respect to the value at room temperature. Advantageously, as depicted in the illustrated example of FIG. 6, the second reference voltage generation circuit 200 of FIG. 2 and/or the third reference voltage generation circuit 300 of FIG. 3 can generate a reference voltage that is relatively independent of temperature and, thus, can serve as a reliable reference voltage to be used by an IC across a wide temperature range.

Figures 7, 8:
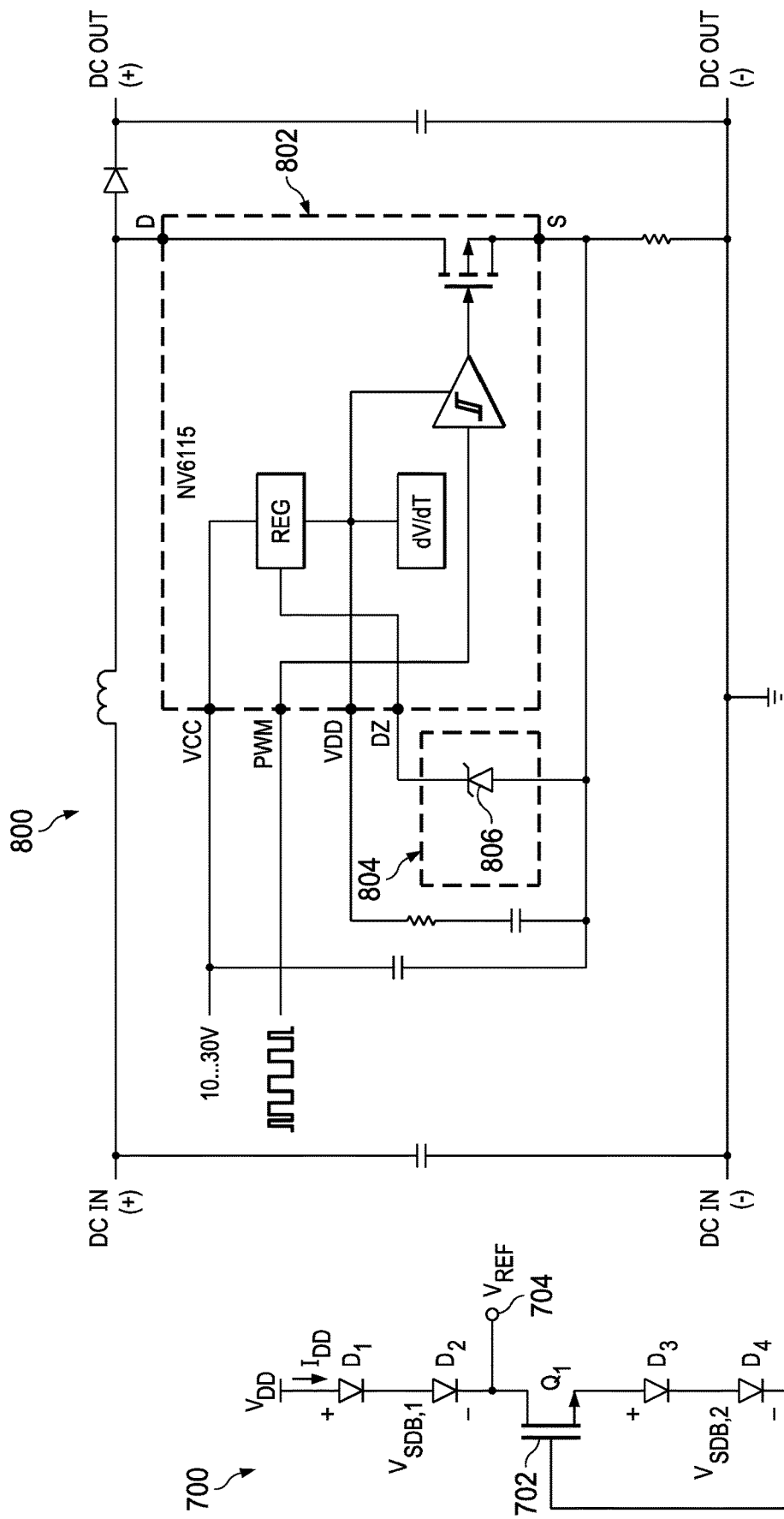
FIG. 7 is a schematic illustration of another example reference voltage generation circuit.
FIG. 8 is a schematic illustration of another example power conversion system including a gallium nitride die and yet another example reference voltage generation circuit.

FIG. 7 is a schematic illustration of a third example reference voltage generation circuit 700. The third reference voltage generation circuit 700 includes a transistor (Q1) 702, which is a depletion mode (D-mode) GaN HEMT, to generate a negative reference voltage ($V_{REF}$) 704. The third reference voltage generation circuit 700 relies on an absolute precision of diodes D1, D2, D3, and/or D4 and/or a threshold voltage of Q1 702 to generate $V_{REF}$ 704. For example, the third reference voltage generation circuit 700 relies on an absolute parameter of D1, D2, D3, D4, and/or Q1 702 to determine $V_{REF}$ 704.

Advantageously, the second reference voltage generation circuit 200 of FIG. 2 and the third reference voltage generation circuit 300 of FIG. 3 are improvements over the third reference voltage generation circuit 700 by generating a positive reference voltage and by determining the positive reference voltage based on a relative parameter (e.g., a change in a gate-to-source voltage in response to a change in drain current density). Advantageously, the reference voltages generated by the second reference voltage generation circuit 200 of FIG. 2 and the third reference voltage generation circuit 300 of FIG. 3 have less variation compared to $V_{REF}$ 704 generated by the third reference voltage generation circuit 700 of FIG. 7.

FIG. 8 is a schematic illustration of a power conversion system 800 including an integrated circuit 802 and a fourth reference voltage generation circuit 804, which includes a Zener diode 806. The integrated circuit 802 is a GaN die. The fourth reference voltage generation circuit 804 generates a reference voltage for the integrated circuit 802 by using an external component, such as the Zener diode 806. The fourth reference voltage generation circuit 804 can generate reference voltages having variations that exceed 5%. The fourth reference voltage generation circuit 804 can require generally larger current levels to generate the reference voltage, which can result in greater power losses of the power conversion system 800. The fourth reference voltage generation circuit 804 uses at least one integrated circuit contact, leg, pin, terminal, etc., of integrated circuit 802 to couple to the Zener diode 806.

Advantageously, the second reference voltage generation circuit 200 of FIG. 2 and the third reference voltage generation circuit 300 of FIG. 3 are improvements over the fourth reference voltage generation circuit 804 by being integrated into an integrated circuit associated with the power conversion system 100 of FIG. 1. Advantageously, the second reference voltage generation circuit 200 of FIG. 2 and the third reference voltage generation circuit 300 of FIG. 3 do not include external components, such as the Zener diode 806 of FIG. 8 to generate $V_{REF}$ 232 of FIGS. 2-3. Advantageously, the second reference voltage generation circuit 200 of FIG. 2 and the third reference voltage generation circuit 300 of FIG. 3 are improvements over the third reference voltage generation circuit 700 by requiring lower current levels than required by the Zener diode 806 of FIG. 8 and, thus, the power conversion system 100 of FIG. 1 has less losses compared to the power conversion system 800 of FIG. 8.

Figure 9C:
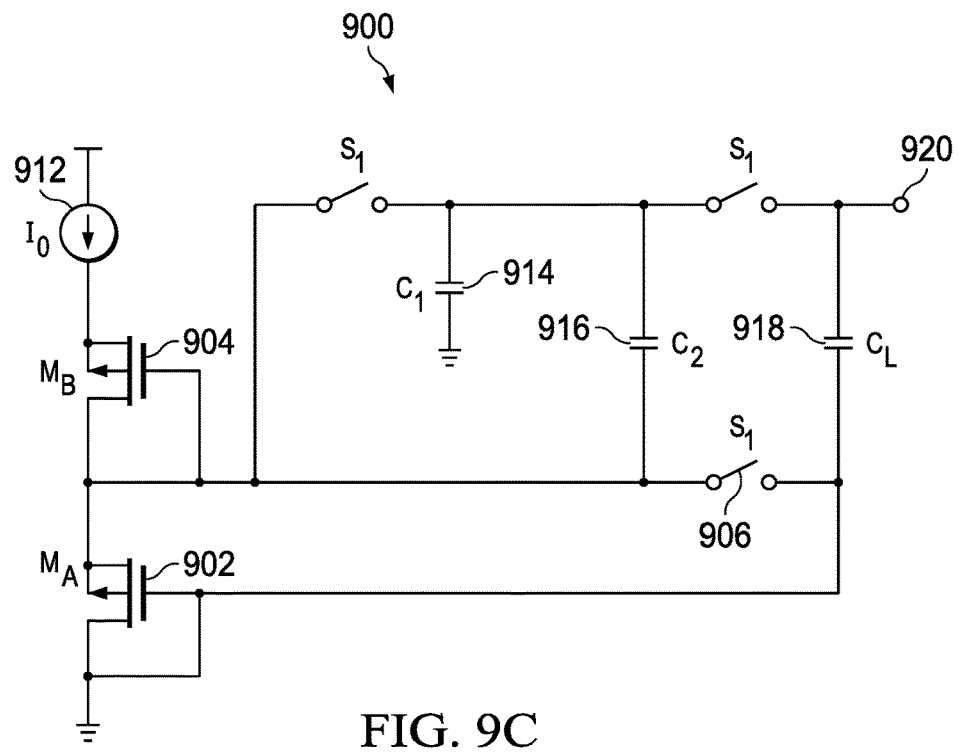
FIGS. 9A-9C are schematic illustrations of another example reference voltage generation circuit in different operating states.
Figure 9A:
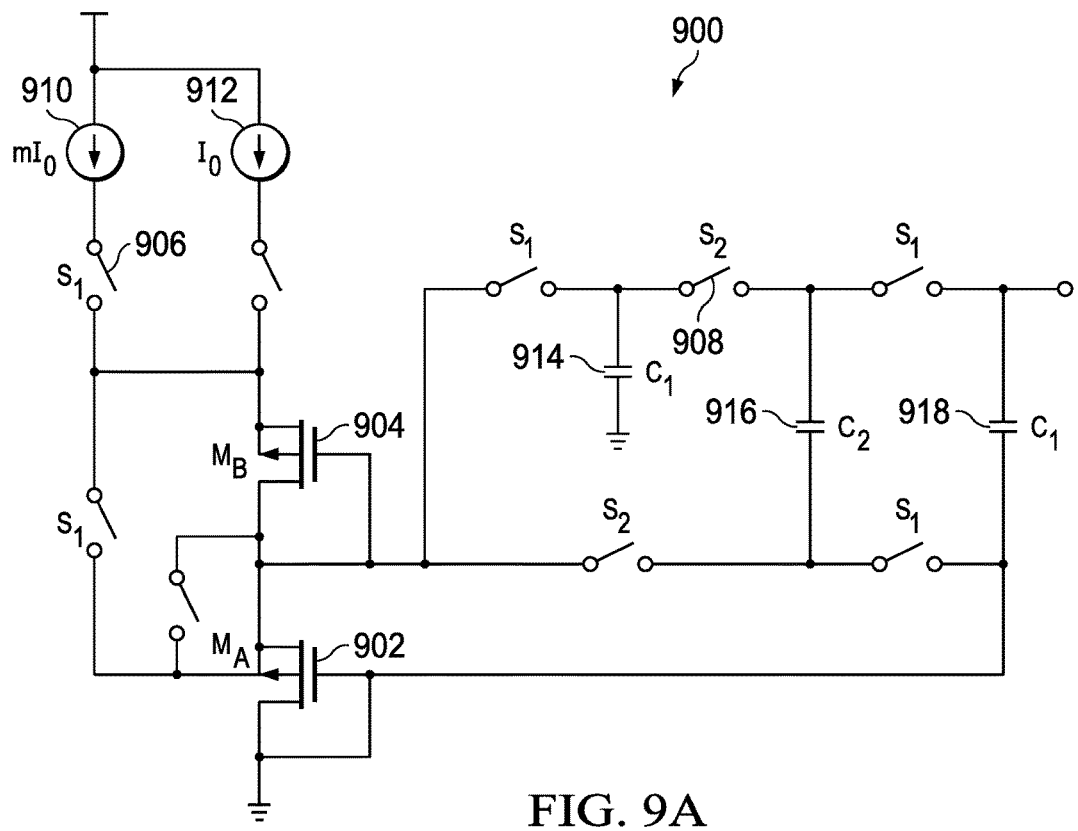
Figure 9B:
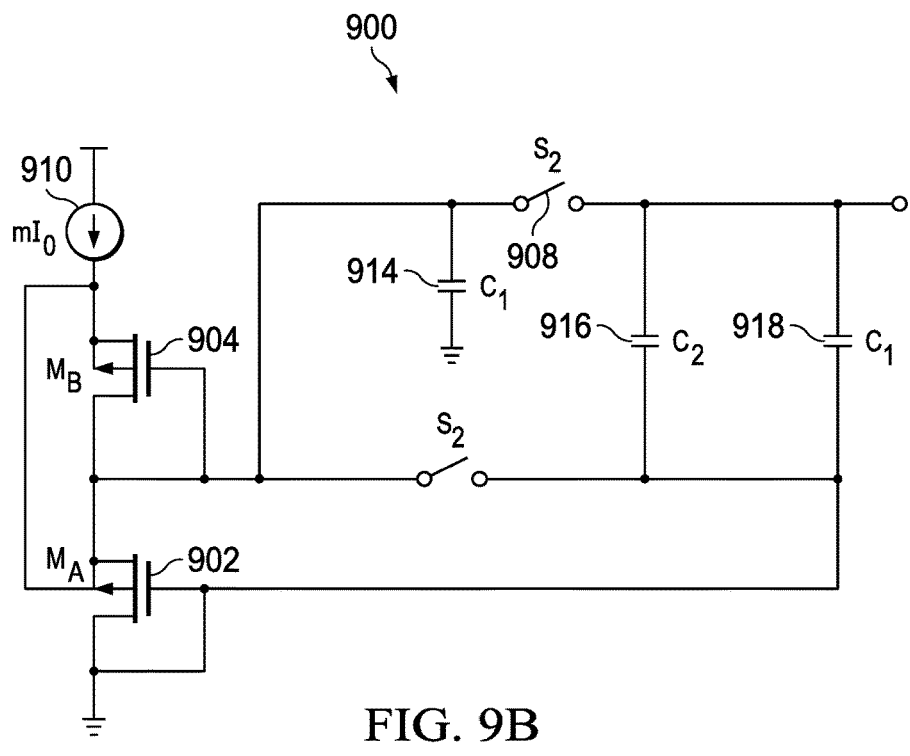

FIGS. 9A-9C are schematic illustrations of a fifth example reference voltage generation circuit 900 in different operating states or working phases. The fifth reference voltage generation circuit 900 is implemented using P-type silicon-based devices, such as a first P-type silicon MOSFET (MA) 902 and a second P-type silicon MOSFET (MB) 904. The fifth reference voltage generation circuit 900 includes first switches (S1) 906 having a first phase and second switches (S2) 908 having a second phase.

FIG. 9B depicts a schematic illustration of the fifth reference voltage generation circuit 900 during a first working phase where the first switches 906 are enabled and are depicted as short circuits, and the second switches 908 are disabled and are depicted as open circuits. A first VGS of MA 902 and MB 904 is generated using a first current source (mI0) 910. The first VGS is stored by a first capacitor (C1) 914. A voltage stored by a second capacitor (C2) 916 is transferred to a third capacitor (CL) 918 to be stored by CL 918.

FIG. 9C depicts a schematic illustration of the fifth reference voltage generation circuit 900 during a second working phase where the first switches 906 are disabled and are depicted as open circuits, and the second switches 908 are enabled and are depicted as short circuits. The first VGS is transferred to a first plate of C2 916. A second VGS of MA 902 and MB 904 is generated using a second current source (I0) 912, where the second VGS is less than the first VGS. In the examples of FIGS. 9A-9C, the second current source 912 is less than the first current source 910. The second VGS is stored by a second plate of C2 916. The voltage stored by CL 918 is transferred to an output terminal 920, where the voltage stored by CL 918 is a difference between the first VGS and the second VGS.

Advantageously, the second reference voltage generation circuit 200 of FIG. 2 and the third reference voltage generation circuit 300 of FIG. 3 are improvements over the fifth reference voltage generation circuit 900 of FIGS. 9A-9C by using E-mode GaN HEMTs instead of P-type silicon MOSFETs. Advantageously, the reference voltage generation circuits 200, 300 of FIGS. 2-3 are improvements over the fifth reference voltage generation circuit 900 of FIGS. 9A-9C by not using multiple transistors in series to generate a VGS, such as MA 902 and MB 904 in FIGS. 9A-9C.

Figure 10:
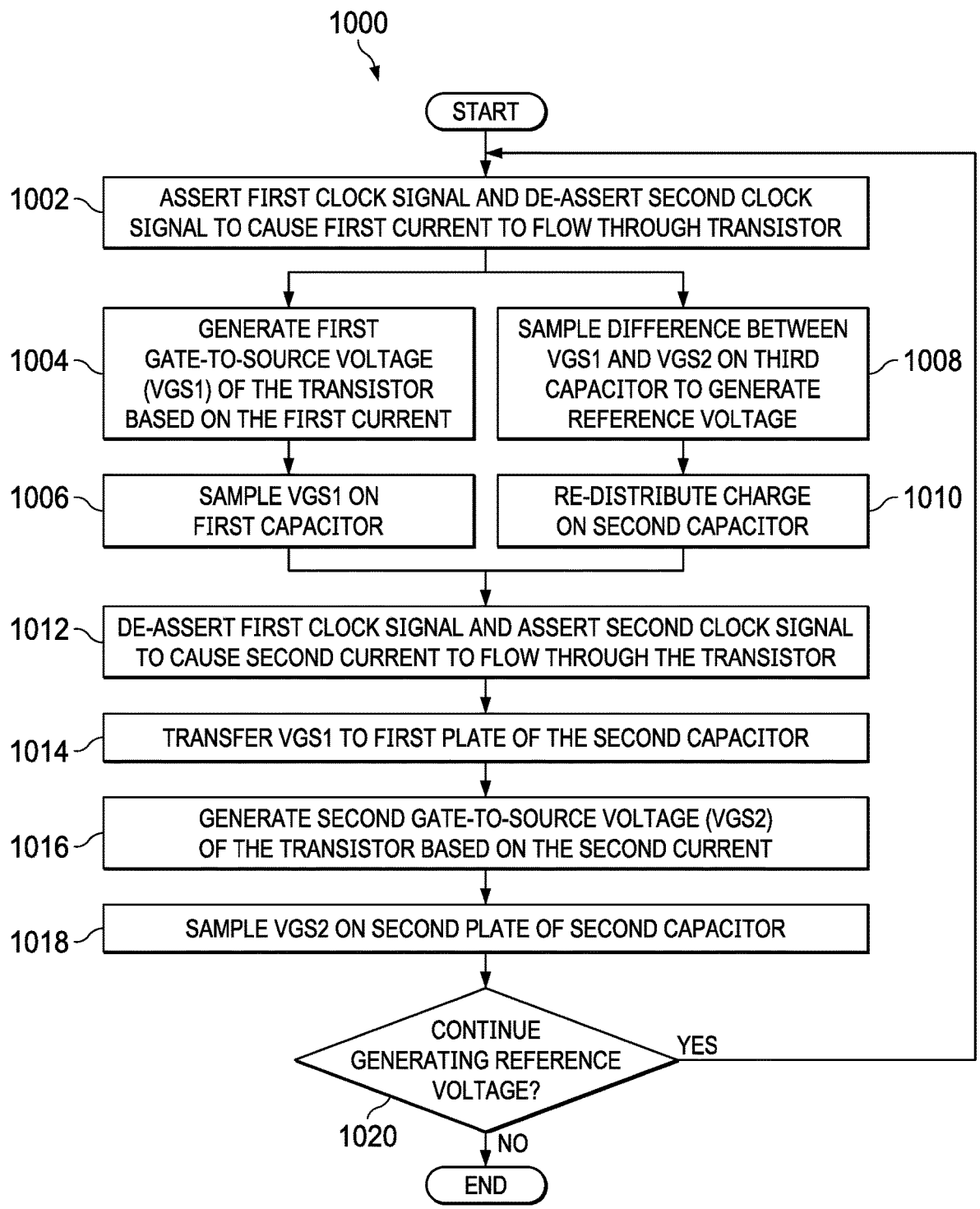
FIG. 10 is a flowchart representative of an example process that may be carried out while utilizing machine readable instructions that can be executed and/or hardware configured to implement the reference voltage generation circuit of FIGS. 1, 2, and/or 3 to generate a reference voltage.

A flowchart representative of an example process that may be carried out while utilizing example hardware logic, example machine readable instructions (e.g., hardware readable instructions), example hardware implemented state machines, and/or any combination thereof for implementing the example controller 120 of FIG. 1, the example controller 263 of FIG. 2, the example clock generator circuit 264, the example non-overlap circuit 266, and/or, more generally, the first example reference voltage generation circuit 102 of FIG. 1, the second example reference voltage generation circuit 200 of FIG. 2 and/or the third example reference voltage generation circuit 300 of FIG. 3, is shown in FIG. 10. The example machine readable instructions may be one or more executable programs or portion(s) of an executable program for execution by programmable processor(s), programmable controller(s), GPU(s), DSP(s), ASIC(s), PLD(s), and/or FPLD(s). The program may be embodied in software stored on a non-transitory computer readable storage medium such as a non-volatile memory, volatile memory, etc., but the entire program and/or parts thereof could alternatively be executed by any other device (e.g., programmable device) and/or embodied in firmware or dedicated hardware. Further, although the example program is described with reference to the flowchart illustrated in FIG. 10, many other methods of implementing the example controller 120 of FIG. 1, the example controller 263 of FIG. 2, the example clock generator circuit 264, the example non-overlap circuit 266, and/or, more generally, the first example reference voltage generation circuit 102 of FIG. 1, the second example reference voltage generation circuit 200 of FIG. 2 and/or the third example reference voltage generation circuit 300 of FIG. 3, may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of an example process 1000 that may be carried out while utilizing machine readable instructions that can be executed and/or hardware configured to implement the controller 120 of FIG. 1, the controller 263 of FIG. 2, the clock generator circuit 264, the non-overlap circuit 266, and/or, more generally, the first reference voltage generation circuit 102 of FIG. 1, the second reference voltage generation circuit 200 of FIG. 2, and/or the third reference voltage generation circuit 300 of FIG. 3, to generate a reference voltage for a device, such as the amplifier 126 of FIG. 1, and/or, more generally, an IC, such as the power conversion system 100 of FIG. 1.

The process 1000 of the example of FIG. 10 begins at block 1002, at which ones(s) of the reference voltage generation circuits 102, 200, 300 of FIGS. 1, 2, and/or 3 assert(s) a first clock signal and de-assert(s) a second clock signal to cause a first current to flow through a transistor. For example, the controller 120 and/or the controller 263 can instruct the clock generator circuit 264 to instruct the non-overlap circuit 266 to assert the first clock signal 224 (FIGS. 2-3) having the first phase 226 (FIGS. 2-3) and de-assert the second clock signal 228 (FIGS. 2-3) having the second phase 230 (FIGS. 2-3). In such examples, SW1 210 and SW3 234 of FIG. 2 are enabled, and SW2 212, SW4 236, and SW5 238 of FIG. 2 are disabled to cause a first quantity of the drain current 225 to flow through the transistor 214 of FIGS. 2-3. In other such examples, Q1 314 and Q3 318 of FIG. 3 are enabled, and Q2 316, Q4 320, and Q5 322 are disabled to cause the first quantity of the drain current 225 to flow through the transistor 214. In some such examples, the transistor 214 operates in the subthreshold (e.g., VGS1, VGS2, etc., is less than VGS(TH) of the transistor 214).

At block 1004, in response to asserting the first clock signal and de-asserting the second clock signal, ones(s) of the reference voltage generation circuits 102, 200, 300 of FIGS. 1, 2, and/or 3 generate(s) a first gate-to-source voltage (VGS1) of the transistor based on the first current. For example, the controller 120 and/or the controller 263 can cause the transistor 214 to generate a first value for $V_{GS,Q}$ 229 of FIGS. 2-3 based on the first quantity of the drain current 225.

At block 1006, in response to generating the first value for $V_{GS,Q}$ 229, ones(s) of the reference voltage generation circuits 102, 200, 300 of FIGS. 1, 2, and/or 3 sample(s) the first value for $V_{GS,Q}$ 229 on a first capacitor. For example, the controller 120 and/or the controller 263 can cause the first value for $V_{GS,Q}$ 229 to be stored on C1 244 (FIGS. 2-3).

At block 1012, ones(s) of the reference voltage generation circuits 102, 200, 300 of FIGS. 1, 2, and/or 3 de-assert(s) the first clock signal and assert(s) the second clock signal to cause a second current to flow through the transistor. For example, the controller 120 and/or the controller 263 can instruct the clock generator circuit 264 to instruct the non-overlap circuit 266 to de-assert the first clock signal 224 having the first phase 226 and assert the second clock signal 228 having the second phase 230. In such examples, SW1 210 and SW3 234 of FIG. 2 are disabled, and SW2 212, SW4 236, and SW5 238 of FIG. 2 are enabled to cause a second quantity of the drain current 225 to flow through the transistor 214 of FIGS. 2-3. In other such examples, Q1 314, Q3 318, and Q8 328 of FIG. 3 are disabled, and Q2 316, Q4 320, Q5 322, Q9 330, and Q10 332 are enabled to cause the second quantity of the drain current 225 to flow through the transistor 214.

At block 1014, in response to de-asserting the first clock signal and asserting the second clock signal at block 1012, ones(s) of the reference voltage generation circuits 102, 200, 300 of FIGS. 1, 2, and/or 3 transfer(s) VGS1 to a first plate of a second capacitor. For example, the controller 120 and/or the controller 263 can cause VGS1 to be transferred from C1 244 to the first plate of C2 246 of FIG. 2. In other examples, the controller 120 and/or the controller 263 can cause VGS1 to be transferred from C1 244 to the first plates of C2.1 334 and C2.2 336.

At block 1016, in response to de-asserting the first clock signal and asserting the second clock signal, ones(s) of the reference voltage generation circuits 102, 200, 300 of FIGS. 1, 2, and/or 3 generate(s) a second gate-to-source voltage (VGS2) of the transistor based on the second current. For example, the controller 120 and/or the controller 263 can cause the transistor 214 to generate a second value for $V_{GS,Q}$ 229 of FIGS. 2-3 based on the second quantity of the drain current 225, where the second value is different from the first value (e.g., the second value is less than the first value).

At block 1018, in response to generating the second value for $V_{GS,Q}$ 229, ones(s) of the reference voltage generation circuits 102, 200, 300 of FIGS. 1, 2, and/or 3 sample(s) the second value for $V_{GS,Q}$ 229 on a second plate of the second capacitor. For example, the controller 120 and/or the controller 263 can cause the second value for $V_{GS,Q}$ 229 to be stored on the second plate of C2 246 of FIG. 2 and/or the second plates of C2.1 334 and C2.2 336 of FIG. 3.

At block 1020, ones(s) of the reference voltage generation circuits 102, 200, 300 of FIGS. 1, 2, and/or 3 determine(s) whether to continue generating a reference voltage. For example, the controller 120 and/or the controller 263 can determine whether to continue generating a reference voltage for the amplifier 126 of FIG. 1, and/or, more generally, the power conversion system 100 of FIG. 1. If, at block 1020, ones(s) of the reference voltage generation circuits 102, 200, 300 of FIGS. 1, 2, and/or 3 determine(s) to continue generating a reference voltage, control returns to block 1002 to assert the first clock signal and de-assert the second clock signal, otherwise the example process 1000 of FIG. 10 concludes.

At block 1008, in response to asserting the first clock signal and de-asserting the second clock signal at block 1002, ones(s) of the reference voltage generation circuits 102, 200, 300 of FIGS. 1, 2, and/or 3 sample(s) a difference between VGS1 and VGS2 on a third capacitor to generate a reference voltage. For example, the controller 120 and/or the controller 263 can cause $C_{OUT}$ 248 of FIG. 2 and/or $C_{BUF}$ 344 of FIG. 3 to sample a difference (e.g., a voltage difference) between the first value of $V_{GS,Q}$ 229 and the second value of $V_{GS,Q}$ 229 on $C_{OUT}$ 248 of FIG. 2 and/or $C_{BUF}$ 344 of FIG. 3. In such examples, the voltage difference can be delivered to the input of the amplifier 126 of FIG. 1, or a different component associated with an IC.

At block 1010, ones(s) of the reference voltage generation circuits 102, 200, 300 of FIGS. 1, 2, and/or 3 discharge the second capacitor. For example, the controller 120 and/or the controller 263 can cause C2 246 of FIG. 2 and/or C2.1 334 and C2.2 336 of FIG. 3 to be discharged to the reference rail 258.

From the foregoing, it will be appreciated that example systems, methods, apparatus, and articles of manufacture have been disclosed that generate a reference voltage using a transistor, such as an E-mode GaN HEMT. For example, the disclosed systems, methods, apparatus, and articles of manufacture can generate a positive reference voltage with reference to a ground or reference rail using GaN. The disclosed systems, methods, apparatus, and articles of manufacture can generate a reference voltage without a PN junction. The disclosed systems, methods, apparatus, and articles of manufacture can generate a reference voltage based on a sub-threshold slope of an E-mode GaN HEMT (e.g., the E-mode GaN HEMT operating in the subthreshold). The disclosed systems, methods, apparatus, and articles of manufacture can generate a reference voltage without a depletion mode device (e.g., a depletion mode silicon MOSFET) and/or without an external component (e.g., a Zener diode). The disclosed systems, methods, apparatus, and articles of manufacture can generate a reference voltage with reduced power consumption and increased accuracy compared to other reference voltage generation circuits.

Example methods, apparatus, systems, and articles of manufacture to generate a reference voltage are disclosed herein. Further examples and combinations thereof include the following:

Example 1 includes a reference voltage generation circuit comprising a voltage generating circuit including an enhancement mode (E-mode) gallium nitride (GaN) transistor, the voltage generating circuit to in response to a first clock signal having a first phase, generate a first voltage associated with the E-mode GaN transistor, and in response to a second clock signal having a second phase different from the first phase, generate a second voltage associated with the E-mode GaN transistor, and a switching capacitor circuit coupled to the voltage generating circuit, the switching capacitor circuit to generate a reference voltage based on a difference between the first voltage and the second voltage.

Example 2 includes the reference voltage generation circuit of example 1, wherein the voltage generating circuit includes a first resistor having a first resistance, a second resistor having a second resistance different than the first resistance, a first switch coupled to the first resistor and the E-mode GaN transistor, the first switch configured to switch in response to the first clock signal to generate a first current to flow through the first resistor and the E-mode GaN transistor, and a second switch coupled to the second resistor and the E-mode GaN transistor, the second switch to generate a second current to flow through the second resistor and the E-mode GaN transistor, the second current less than the first current, at least one of the first switch or the second switch is an E-mode GaN transistor.

Example 3 includes the reference voltage generation circuit of example 1, wherein the switching capacitor circuit includes a first capacitor having a first plate and a second plate, the first plate to store the first voltage, a second capacitor having a third plate and a fourth plate, the third plate to store the first voltage, the fourth plate to store the second voltage, and a third capacitor having a fifth plate and a sixth plate, the fifth plate to store the reference voltage, the sixth plate coupled to a ground rail.

Example 4 includes the reference voltage generation circuit of example 3, wherein the switching capacitor circuit includes a first switch coupled to the E-mode GaN transistor and the first plate, a second switch coupled to the first switch, the first plate, and the third plate, a third switch coupled to the second switch, the third plate, and the fifth plate, a fourth switch coupled to the E-mode GaN transistor and the fourth plate, and a fifth switch coupled to the fourth switch, the fourth plate, and the sixth plate, at least one of the first switch, the second switch, the third switch, the fourth switch, or the fifth switch is an E-mode GaN transistor.

Example 5 includes the reference voltage generation circuit of example 1, wherein the switching capacitor circuit includes a first capacitor having a first plate and a second plate, the first plate to store the first voltage, a second capacitor having a third plate and a fourth plate, the second capacitor to store a first voltage difference based on the third plate storing the first voltage and the fourth plate storing the second voltage, a third capacitor having a fifth plate and a sixth plate, the third capacitor to store a second voltage difference based on the fifth plate storing the first voltage and the sixth plate storing the second voltage, and a fourth capacitor having a seventh plate and an eighth plate, the fourth capacitor to store the reference voltage based on a sum of the first voltage difference and the second voltage difference, the seventh plate to store the reference voltage, the eighth plate coupled to a ground rail.

Example 6 includes the reference voltage generation circuit of example 5, wherein the switching capacitor circuit includes a charge pump circuit including the second capacitor and the third capacitor, a first switch coupled to the E-mode GaN transistor and the first plate, a second switch coupled to the first switch, the first plate, and the charge pump circuit, a third switch coupled to the charge pump circuit and the seventh plate, and a fourth switch coupled to the E-mode GaN transistor and the charge pump circuit, and a fifth switch coupled to the fourth switch, the charge pump circuit, and the eighth plate, at least one of the first switch, the second switch, the third switch, the fourth switch, or the fifth switch is an E-mode GaN transistor.

Example 7 includes the reference voltage generation circuit of example 6, wherein the charge pump circuit includes a sixth switch coupled to the third plate and the sixth plate, a seventh switch coupled to sixth switch, the third plate, and the fifth plate, and an eighth switch coupled to the sixth switch, the fourth plate, and the sixth plate, at least one of the sixth switch, the seventh switch, or the eighth switch is an E-mode GaN transistor.

Example 8 includes the reference voltage generation circuit of example 1, further including a compensation network coupled to the switching capacitor circuit, the compensation network including a first switch coupled to the switching capacitor circuit, a capacitor having a first plate and a second plate, the first plate coupled to the first switch, the second plate coupled to a reference rail, and a second switch coupled to the first switch and the first plate, at least one of the first switch or the second switch is an E-mode GaN transistor.

Example 9 includes the reference voltage generation circuit of example 1, further including a low pass filter coupled to the switching capacitor circuit, the low pass filter including a first capacitor coupled to the switching capacitor circuit, a resistor coupled to the first capacitor and the switching capacitor circuit, and a second capacitor coupled to the resistor.

Example 10 includes a power conversion system comprising a power converter to be coupled to a load, a controller coupled to the power converter, the controller to control the power converter based on a comparison of a first voltage generated by the power converter to a reference voltage, and a reference voltage generation circuit to generate the reference voltage by in response to a first clock signal having a first phase, generate a third voltage associated with an E-mode GaN transistor, and in response to a second clock signal having a second phase different from the first phase, generate a fourth voltage associated with the E-mode GaN transistor, and generate the reference voltage based on a difference between the third voltage and the fourth voltage.

Example 11 includes the power conversion system of example 10, further including an amplifier having an output, a first input, and a second input, the output coupled to the controller, the first input coupled to a feedback divider circuit, the feedback divider circuit coupled to the power converter, and the second input coupled to the reference voltage generation circuit.

Example 12 includes the power conversion system of example 10, wherein the power converter is a buck converter, a boost converter, or a buck-boost converter, and the load is included in an electric vehicle or a hybrid-electric vehicle.

Example 13 includes the power conversion system of example 10, wherein the reference voltage generation circuit includes a voltage generator circuit to generate the third voltage and the fourth voltage, and a voltage difference generator circuit to determine the reference voltage based on a fifth voltage greater than the difference between the third voltage and the fourth voltage.

Example 14 includes the power conversion system of example 13, wherein the E-mode GaN transistor is a first E-mode GaN transistor, and the voltage generating circuit includes the first E-mode GaN transistor, a second E-mode GaN transistor coupled to the first E-mode GaN transistor, the second E-mode GaN transistor configured to switch in response to the first clock signal to generate a first current to flow through the first E-mode GaN transistor, and a third E-mode GaN transistor coupled to the first E-mode GaN transistor, the third E-mode GaN transistor to generate a second current to flow through the first E-mode GaN transistor, the second current less than the first current.

Example 15 includes the power conversion system of example 13, wherein the E-mode GaN transistor is a first E-mode GaN transistor, and the voltage difference generator circuit includes a charge pump circuit, a first capacitor having a first plate and a second plate, a second capacitor having a third plate and a fourth plate, a second E-mode GaN transistor coupled to the first E-mode GaN transistor and the first plate, a third E-mode GaN transistor coupled to the first E-mode GaN transistor, the first plate, and the charge pump circuit, a fourth E-mode GaN transistor coupled to the charge pump circuit and the third plate, and a fifth E-mode GaN transistor coupled to the first E-mode GaN transistor and the charge pump circuit, and a sixth E-mode GaN transistor coupled to the fifth E-mode GaN transistor, the charge pump circuit, and the fourth plate.

Example 16 includes the reference voltage generation circuit of example 15, wherein the charge pump circuit includes a third capacitor having a fifth plate and a sixth plate, a fourth capacitor having a seventh plate and an eighth plate, a seventh E-mode GaN transistor coupled to the fifth plate and the eighth plate, an eighth E-mode GaN transistor coupled to seventh E-mode GaN transistor, the fifth plate, and the seventh plate, and a ninth E-mode GaN transistor coupled to the seventh E-mode GaN transistor, the sixth plate, and the eighth plate.

Example 17 includes a method to generate a reference voltage, the method comprising in response to a first clock signal having a first phase, generating a first voltage associated with an E-mode GaN transistor, in response to a second clock signal having a second phase different from the first phase, generating a second voltage associated with the E-mode GaN transistor, and generating a reference voltage based on a difference between the first voltage and the second voltage with a switching capacitor circuit.

Example 18 includes the method of example 17, further including turning on a first switch in response to the first clock signal to generate a first current to flow through the E-mode GaN transistor to generate the first voltage, and turning on a second switch in response to the second clock signal to generate a second current to flow through the E-mode GaN transistor, the second current less than the first current, at least one of the first switch or the second switch is an E-mode GaN transistor.

Example 19 includes the method of example 17, further including turning on a first switch to generate the first voltage by causing a first current to flow through the E-mode GaN transistor, and in response to the first clock signal, turning on a second switch to generate the second voltage by causing a second current to flow through the E-mode GaN transistor, the second current based on the first current flowing through the first switch and a third current flowing through the second switch, the first current less than the third current, at least one of the first switch or the second switch is an E-mode GaN transistor.

Example 20 includes the method of example 17, further including in response to the first clock signal, turning on a first switch coupled to the E-mode GaN transistor to transfer the first voltage to a first capacitor, in response to the second clock signal, turning on a second switch coupled to the first switch to transfer the first voltage to a first plate of a second capacitor, in response to the second clock signal, turning on a third switch coupled to the E-mode GaN transistor to transfer the second voltage to a second plate of the second capacitor, and in response to the first clock signal, turning on a fourth switch coupled to the second switch and the first plate to transfer the difference to a third capacitor.

Example 21 includes the method of example 17, further including in response to the first clock signal, turning on a first switch coupled to the E-mode GaN transistor to transfer the first voltage to a first capacitor, in response to the second clock signal, turning on a second switch and a third switch, the second switch coupled to the first switch and the third switch, the second switch and the third switch to transfer the first voltage to a first plate of a second capacitor and a first plate of a third capacitor, in response to the second clock signal, turning on a fourth switch and a fifth switch, the fourth switch coupled to the E-mode GaN transistor and the fifth switch, the fourth switch and the fifth switch to transfer the second voltage to a second plate of the second capacitor and a second plate of the third capacitor, and in response to the first clock signal, turning on a sixth switch coupled to the third switch and the first plate of the third capacitor, the sixth switch to transfer the difference to a fourth capacitor.

Example 22 includes a reference circuit comprising a voltage generating circuit including a first resistor having a first resistance, a second resistor having a second resistance different than the first resistance, a first switch coupled to the first resistor, a second switch coupled to the second resistor, an enhancement mode (E-mode) gallium nitride (GaN) transistor coupled to the first switch and the second switch, and a switching capacitor circuit coupled to the voltage generating circuit.

Example 23 includes the reference circuit of example 22, wherein the E-mode GaN transistor is a first E-mode GaN transistor, the second switch is a second E-mode GaN transistor, a gate of the second E-mode GaN transistor and the first ends of the first resistor and the second resistor are coupled to a voltage rail, a first current terminal of the second E-mode GaN transistor is coupled to a second end of the second resistor, and a second current terminal of the second E-mode GaN transistor is coupled to a third current terminal of the first E-mode GaN transistor.

Example 24 includes the reference circuit of example 22, wherein the switching capacitor circuit includes a first capacitor having a first plate and a second plate, the second plate coupled to a ground rail, a second capacitor having a third plate and a fourth plate, a third switch coupled to the first plate and a gate of the E-mode GaN transistor, and a fourth switch coupled to the first plate and the third plate, and a fifth switch coupled to the gate of the E-mode GaN transistor and the fourth plate.

Example 25 includes the reference circuit of example 24, wherein the switching capacitor circuit includes a third capacitor having a fifth plate and a sixth plate, the sixth plate coupled to the ground rail, a sixth switch coupled to the third plate and the fifth plate, and a seventh switch coupled to the fifth switch, the fourth plate, the sixth plate, and the ground rail.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A reference voltage generation circuit comprising:
   a first circuit including:
      an enhancement mode (E-mode) gallium nitride (GaN) transistor having first and second terminals and a gate, the first terminal directly connected to the gate;
      a first switch having a respective first terminal, its first terminal directly connected to the first terminal and gate of the E-mode GaN transistor; and
      a second switch having a respective first terminal, its first terminal directly connected to the first terminal of the first switch; and
   a second circuit coupled to the gate of the E-mode GaN transistor, the second circuit configured to: sample a first voltage between the gate and the second terminal; sample a second voltage between the gate and the second terminal; and generate a positive reference voltage based on a difference between the first and second voltages.

2. A reference voltage generation circuit comprising:
   a first circuit including:
      an enhancement mode (E-mode) gallium nitride (GaN) transistor having first and second terminals and a gate, the first terminal connected to the gate;
      a first resistor;
      a second resistor;
      a first switch connected between the first resistor and the first terminal and the gate of the E-mode GaN transistor; and
      a second switch connected between the second resistor and the first terminal and the gate of the E-mode GaN transistor,
      in which at least one of the first switch or the second switch is an E-mode GaN transistor; and
   a second circuit coupled to the gate of the E-mode GaN transistor, the second circuit including switches and capacitors coupled together.

3. The reference voltage generation circuit of claim 1, wherein the second circuit includes:
   a first capacitor having a first plate and a second plate, the first plate to store the first voltage;
   a second capacitor having a third plate and a fourth plate, the third plate to store the first voltage, the fourth plate to store the second voltage; and
   a third capacitor having a fifth plate and a sixth plate, the fifth plate to store the reference voltage, the sixth plate coupled to a ground rail.

4. The reference voltage generation circuit of claim 3, wherein the second circuit includes:
   a third switch coupled to the E-mode GaN transistor and the first plate;
   a fourth switch coupled to the third switch, the first plate, and the third plate;
   a fifth switch coupled to the fourth switch, the third plate, and the fifth plate;
   a sixth switch coupled to the E-mode GaN transistor and the fourth plate; and
   a seventh switch coupled to the sixth switch, the fourth plate, and the sixth plate, at least one of the third switch, the fourth switch, the fifth switch, the sixth switch, or the seventh switch is an E-mode GaN transistor.

5. The reference voltage generation circuit of claim 1, wherein the second circuit includes:
   a first capacitor having a first plate and a second plate, the first plate to store the first voltage;
   a second capacitor having a third plate and a fourth plate, the second capacitor to store a first voltage difference based on the third plate storing the first voltage and the fourth plate storing the second voltage;
   a third capacitor having a fifth plate and a sixth plate, the third capacitor to store a second voltage difference based on the fifth plate storing the first voltage and the sixth plate storing the second voltage; and
   a fourth capacitor having a seventh plate and an eighth plate, the fourth capacitor to store the reference voltage based on a sum of the first voltage difference and the second voltage difference, the seventh plate to store the reference voltage, the eighth plate coupled to a ground rail.

6. The reference voltage generation circuit of claim 5, wherein the second circuit includes:
   a charge pump circuit including the second capacitor and the third capacitor;
   a third switch coupled to the E-mode GaN transistor and the first plate;
   a fourth switch coupled to the third switch, the first plate, and the charge pump circuit;
   a fifth switch coupled to the charge pump circuit and the seventh plate; and
   a sixth switch coupled to the E-mode GaN transistor and the charge pump circuit; and
   a seventh switch coupled to the sixth switch, the charge pump circuit, and the eighth plate, at least one of the third switch, the fourth switch, the fifth switch, the sixth switch, or the seventh switch is an E-mode GaN transistor.

7. The reference voltage generation circuit of claim 6, wherein the charge pump circuit includes:
   a eighth switch coupled to the third plate and the sixth plate;
   a ninth switch coupled to eighth switch, the third plate, and the fifth plate; and
   a tenth switch coupled to the eighth switch, the fourth plate, and the sixth plate, at least one of the eighth switch, the ninth switch, or the tenth is an E-mode GaN transistor.

8. The reference voltage generation circuit of claim 1, further including a compensation network coupled to the second circuit, the compensation network including:
   a third switch coupled to the second circuit;

a capacitor having a first plate and a second plate, the first plate coupled to the third switch, the second plate coupled to a reference node; and a fourth switch coupled to the third switch and the first plate, at least one of the third switch or the fourth switch is an E-mode GaN transistor.

9. The reference voltage generation circuit of claim 1, further including a low pass filter coupled to the second circuit, the low pass filter including:
   a first capacitor coupled to the switching capacitor circuit;
   a resistor coupled to the first capacitor and the second circuit; and
   a second capacitor coupled to the resistor.

10. A power conversion system comprising:
   a power converter;
   a controller coupled to the power converter, the controller configured to control the power converter based on a comparison of a reference voltage to a first voltage generated by the power converter; and
   a reference voltage generation circuit including:
      a first circuit including:
         an enhancement mode (E-mode) gallium nitride (GaN) transistor having first and second transistor terminals and a gate, the first transistor terminal directly connected to the gate;
         a first switch having a first switch terminal directly connected to the first transistor terminal and the gate;
         a second switch having a second switch terminal directly connected to the first transistor terminal and the gate; and
         wherein the first circuit is configured to generate a second voltage between the gate and the second transistor terminal responsive to the first switch closing and the second switch opening and generate a third voltage between the gate and the second transistor terminal responsive to the first switch opening and the second switch closing; and
      a second circuit configured to generate the reference voltage based on a difference between the third voltage and the fourth voltage.

11. The power conversion system of claim 10, further including an amplifier having an output, a first input, and a second input, the output coupled to the controller, the first input coupled to a feedback divider circuit, the feedback divider circuit coupled to the power converter, and the second input coupled to the reference voltage generation circuit.

12. The power conversion system of claim 10, wherein the power converter is a buck converter, a boost converter, or a buck-boost converter.

13. The power conversion system of claim 10, in which:
the E-mode GaN transistor is a first E-mode GaN transistor;
   the first switch is a second E-mode GaN transistor configured to open in response to a first clock signal to generate a first current to flow through the first E-mode GaN transistor; and
   the second switch is a third E-mode GaN transistor configured to generate a second current to flow through the first E-mode GaN transistor, the second current less than the first current.

14. The power conversion system of claim 10, wherein the E-mode GaN transistor is a first E-mode GaN transistor, and the second circuit includes:
   a charge pump circuit;
   a first capacitor having a first plate and a second plate;
   a second capacitor having a third plate and a fourth plate;

a second E-mode GaN transistor coupled to the first E-mode GaN transistor and the first plate;

a third E-mode GaN transistor coupled to the first E-mode GaN transistor, the first plate, and the charge pump circuit;

a fourth E-mode GaN transistor coupled to the charge pump circuit and the third plate; and a fifth E-mode GaN transistor coupled to the first E-mode GaN transistor and the charge pump circuit; and a sixth E-mode GaN transistor coupled to the fifth E-mode GaN transistor, the charge pump circuit, and the fourth plate.

15. The reference voltage generation circuit of claim 14, wherein the charge pump circuit includes:
   a third capacitor having a fifth plate and a sixth plate;
   a fourth capacitor having a seventh plate and an eighth plate;
   a seventh E-mode GaN transistor coupled to the fifth plate and the eighth plate;
   an eighth E-mode GaN transistor coupled to seventh E-mode GaN transistor, the fifth plate, and the seventh plate; and
   a ninth E-mode GaN transistor coupled to the seventh E-mode GaN transistor, the sixth plate, and the eighth plate.

16. A method to generate a reference voltage, the method comprising:
   closing a first switch and opening a second switch directly connected to a drain and a gate of an enhancement mode (E-mode) gallium nitride (GaN) transistor to generate a first drain current in the E-mode GaN transistor;
   sampling a first gate to source voltage (Vgs) of the E-mode GaN transistor, the first Vgs generated responsive to the first drain current;
   opening the first switch and closing the second switch to generate a second drain current in the E-mode GaN transistor;
   sampling a second Vgs of the E-mode GaN transistor, the second Vgs generated responsive to the second drain current in the E-mode GaN transistor; and
   generating a reference voltage based on a difference between the first Vgs and the second Vgs.

17. The method of claim 16, wherein:
closing the first switch includes closing a second E-mode GaN transistor; and
closing the second switch includes closing a third E-mode GaN transistor.

18. The method of claim 16, further including:
responsive to a first clock signal, closing a third switch coupled to the E-mode GaN transistor to transfer the first Vgs to a first capacitor;
responsive to a second clock signal, closing a fourth switch coupled to the third switch to transfer the first Vgs to a first plate of a second capacitor;
responsive to the second clock signal, closing a fifth switch coupled to the E-mode GaN transistor to transfer the second Vgs to a second plate of the second capacitor; and
responsive to the first clock signal, closing a sixth switch coupled to the fourth switch and the first plate to transfer the difference to a third capacitor.

19. The method of claim 16, further including:
responsive to a first clock signal, closing a third switch coupled to the E-mode GaN transistor to transfer the first voltage to a first capacitor;

responsive to a second clock signal, closing a fourth switch and a fifth switch, the fourth switch coupled to the third switch and the fifth switch, the fourth switch and the fifth switch to transfer the first voltage to a first plate of a second capacitor and a first plate of a third capacitor;

responsive to the second clock signal, closing a sixth switch and a seventh switch, the sixth switch coupled to the E-mode GaN transistor and the seventh switch, the sixth switch and the seventh switch to transfer the second voltage to a second plate of the second capacitor and a second plate of the third capacitor; and responsive to the first clock signal, closing an eighth switch coupled to the fifth switch and the first plate of the third capacitor, the eighth switch to transfer the difference to a fourth capacitor.

20. A reference circuit comprising:
a first circuit including:
   a first resistor having a first resistor terminal;
   a second resistor having a second resistor terminal;
   a first switch having first and second switch terminals, the first switch terminal coupled to the first resistor terminal;
   a second switch having third and fourth switch terminals, the third switch terminal coupled to the second resistor terminal;
   an enhancement mode (E-mode) gallium nitride (GaN) transistor having first and second transistor terminals and a gate, the first transistor terminal directly connected to the gate and directly connected to the second and fourth switch terminals; and
a second circuit coupled to the gate of the E-mode GaN transistor, the second circuit configured to: sample a first voltage between the gate and the second terminal; sample a second voltage between the gate and the second terminal; and generate a reference voltage based on a difference between the first and second voltages.

21. The reference circuit of claim 20, wherein the E-mode GaN transistor is a first E-mode GaN transistor, the second switch is a second E-mode GaN transistor, in which a gate of the second E-mode GaN transistor, a third resistor terminal of the first resistor, and a fourth resistor terminal of the second resistor are coupled to a voltage node, a third transistor terminal of the second E-mode GaN transistor is coupled to the second resistor terminal of the second resistor, and a fourth transistor terminal of the second E-mode GaN transistor is coupled to the first transistor terminal of the first E-mode GaN transistor.

22. The reference circuit of claim 20, wherein the second circuit includes:
   a first capacitor having a first plate and a second plate, the second plate coupled to a ground node;
   a second capacitor having a third plate and a fourth plate;
   a third switch coupled to the first plate and the gate of the E-mode GaN transistor; and
   a fourth switch coupled to the first plate and the third plate; and
   a fifth switch coupled to the gate of the E-mode GaN transistor and the fourth plate.

23. The reference circuit of claim 22, wherein the second circuit includes:
   a third capacitor having a fifth plate and a sixth plate, the sixth plate coupled to the ground node;
   a sixth switch coupled to the third plate and the fifth plate; and
   a seventh switch coupled to the fifth switch, the fourth plate, the sixth plate, and the ground node.

* * * * *